United States Patent
Horemuz et al.

(10) Patent No.: US 12,289,195 B2
(45) Date of Patent: Apr. 29, 2025

(54) AUTOMATED ROOT CAUSE ANALYSIS OF NETWORK ISSUES IN A CELLULAR NETWORK USING MACHINE LEARNING

(71) Applicant: Telefonaktiebolaget LM Ericsson (publ), Stockholm (SE)

(72) Inventors: Michal Horemuz, Danderyd (SE); Jared Keown, Sundbyberg (SE); Rahul Jain, Bangalore (IN); Cesar Marco Rubio, Madrid (ES); Kin Soon Douglas Ho, Mount Waverley (AU); Philipp Frank, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/548,715

(22) PCT Filed: Mar. 2, 2022

(86) PCT No.: PCT/EP2022/055251
§ 371 (c)(1),
(2) Date: Sep. 1, 2023

(87) PCT Pub. No.: WO2022/184762
PCT Pub. Date: Sep. 9, 2022

(65) Prior Publication Data
US 2024/0171452 A1   May 23, 2024

(30) Foreign Application Priority Data
Mar. 2, 2021   (IN) .............................. 202141008813

(51) Int. Cl.
G06F 15/173   (2006.01)
H04L 41/0631   (2022.01)
(Continued)

(52) U.S. Cl.
CPC ........ H04L 41/0645 (2013.01); H04L 41/145 (2013.01); H04W 28/0958 (2020.05)

(58) Field of Classification Search
CPC ............. H04L 41/0645; H04L 41/145; H04W 28/0958
See application file for complete search history.

(56) References Cited

U.S. PATENT DOCUMENTS 9,326,196 B1 *   4/2016   Sitaram ........... H04W 36/00835
2010/0203881 A1   8/2010   del Rio Romero et al.
(Continued)

FOREIGN PATENT DOCUMENTS

WO   2020/164739 A1   8/2020

OTHER PUBLICATIONS

International Search Report and the Written Opinion of the International Searching Authority, issued in corresponding International Application No. PCT/EP2022/055251, dated Jun. 22, 2022, 12 pages.
(Continued)

Primary Examiner — Duyen M Doan
(74) Attorney, Agent, or Firm — Rothwell, Figg, Ernst & Manbeck, P.C.

(57) ABSTRACT

A computer-implemented method for analyzing issues in a cellular network is provided. The cellular network includes a plurality of cells, including source cells and neighbor cells. The method includes building a network graph representing features of the cells. The method includes identifying, using the network graph, sub-graphs for each source cell indicating a network issue. The method includes, for each network issue of the source cell for each sub-graph, ranking each feature. The method includes, for each source cell, training, using a feature set identified, a first machine learning (ML) model. The method includes training a second ML model,
(Continued)

using patterns identified by each cluster, to classify an unidentified pattern of one or more neighbor cells contribution to the source cell network issue and identify root cause information for the issue.

20 Claims, 22 Drawing Sheets

(51) Int. Cl.
*H04L 41/14* (2022.01)
*H04W 28/08* (2023.01)

(56) References Cited

U.S. PATENT DOCUMENTS

| | | | |
|---|---|---|---|
| 2016/0309419 A1* | 10/2016 | Makhlouf | H04B 17/345 |
| 2017/0353991 A1 | 12/2017 | Tapia | |
| 2019/0014487 A1* | 1/2019 | Yang | G06N 3/084 |
| 2019/0014488 A1* | 1/2019 | Tan | G06N 3/044 |
| 2020/0084087 A1 | 3/2020 | Sharma et al. | |
| 2020/0169483 A1 | 5/2020 | Kursun | |
| 2023/0276431 A1* | 8/2023 | Zhao | H04W 72/1263 370/329 |
| 2024/0064532 A1* | 2/2024 | Rodriguez Membrive | G06N 3/045 |

OTHER PUBLICATIONS

Vy, Le Luong et al., "Big Data and Machine Learning Driven Handover Management and Forecasting", 2017 IEEE Conference on Standards for Communications and Networking (CSCN), IEEE, Sep. 18, 2017 (Sep. 18, 2017), pp. 214-219, XP033241344.

McInnes, Leland et al., "hdbscan: Hierarchical density based clustering" Journal of Open Source Software, 2(11), 205 (2017), 2 pages.

* cited by examiner

AUTOMATED ROOT CAUSE ANALYSIS OF NETWORK ISSUES IN A CELLULAR NETWORK USING MACHINE LEARNING

CROSS REFERENCE TO RELATED APPLICATION(S)

This application is a 35 U.S.C. § 371 National Phase Entry Application from PCT/EP2022/055251, filed Mar. 2, 2022, designating the United States, and also claims the benefit of Indian Application No. IN 202141008813, filed Mar. 2, 2021, the disclosures of which are incorporated herein by reference in their entirety.

TECHNICAL FIELD

Disclosed are embodiments related to root cause analysis of network issues in a cellular network and, in particular, to automated root cause analysis of network issues using machine learning (ML).

BACKGROUND

In a Cellular Network (such as 4G or 5G networks), cells often suffer from a wide variety of issues like, for example, excessive handover failures, signaling load, cell load, etc. Sometimes, these issues are driven by the conditions originated in neighbor cells of a source cell. For example, a high number of user equipments, UEs, might encounter handover failures or radio link failures while moving from one cell to another at an instance in time. To address such issues, it is imperative to find out the root cause behind the issue, which could even be related to neighbor cells.

Given that one source cell (i.e., the cell where the issue was originally detected) could be connected to a variable number of neighbor cells (i.e., the cells interacting with the source cell), it is a non-trivial problem to find out which neighbor cells are contributing to the issue at the source cell and why. If these questions are answered correctly and proper adjustments are applied to neighbor cells, better performance can be obtained in both the source cell and its neighbor cells.

With the advent of 5G, the complexity of cellular networks will continue to increase. Such complexity makes it all the more important to have automated methods that can quickly determine issue root causes as they arise.

SUMMARY

Current approaches do not provide the diagnostic information required to understand each issue's root cause. While neighbor cell's information is taken into consideration in some solutions, this information is aggregated to cell level to simplify the solution's architecture. Also, these solutions only consider the source cell's own and outgoing relational metrics. The neighbor cells' own metrics and incoming relational metrics are not considered.

Expert solutions for root-cause analysis rely mainly on manually defined rules and thresholds. Due to the increasing complexities in the modern networks, it is impossible to apply rules for all possible root causes and scenarios. There are hundreds of performance metrics, thousands of tunable configurations and this is compounded over hundreds of relations. The permutations are near impossible to be captured based on past experience alone. For a single cell's issue, it can be contributed by more than one relation, and each of these relations can yield a different set of root causes. Even if a massive collection of domain knowledge over the different network topologies and configurations is achievable, this would not have captured every single scenario that is likely to happen. Such solutions are simply not scalable nor sustainable.

Also, as these rule-based solutions are built on domain knowledge, they are also very static and hard to adapt as networks evolve over time. A rule that was built yesterday might be obsolete today with the introduction of new elements or features into the network. For example, in the advent of 5G, these domain knowledges can only be acquired after months of tuning and troubleshooting, before they can be identified as more common issues and consolidated into new sets of rules-based solutions.

Thus, an automatic and data driven approach would be helpful in quickly and systematically addressing such issues. This solution would have to consider not only source cells metrics, but also the relational metrics and the neighbors' metrics. The solution needs also to be adaptable, scalable and can be easily used in any type of network topology and configurations.

While customer demand for network automation continues to grow, they first and foremost want systems they can trust. That trust is gained by using explainable models that describe exactly why a particular decision was made. In the context of network optimization, explainability involves not only determining whether a cell has an issue, but also describing precisely why that issue occurred and how it can be resolved. Some of the embodiments disclosed herein provide an explanation for each of the issues it identifies and proposes a solution to improve the performance of the affected cells. Also, the automated nature of the embodiments disclosed herein allows it to adapt better to future changes in network configurations and performance. This adaptability is in contrast with existing solutions, which rely on customized thresholds that must be monitored and/or changed as the network evolves.

In comparison to other root cause analysis approaches, embodiments disclosed herein provide an end-to-end solution which constructs a graph-shaped dataset considering cell Key Performance Indicators (KPI)s, handover stats, as well as physical factors such as proximity and overlap. This data transformation gives an improved view of the structure of the network and allows for graph-based methods to be used. Resulting graph-shaped data allows for easy lookups and indexing of particular cells and their immediate neighbors, as well as information about the connections between cells.

Some of the embodiments disclosed herein perform issue classification on any cell in the graph (source cell). The classification is performed using a set of KPI's belonging to the source cell itself, a set of (possibly different) KPI's belonging to the neighbors, and a set of KPI's describing the connections from source cell to each of the neighbors, and from each of the neighbors to the source cell.

Some of the embodiments disclosed herein identify issue root causes. Due to the wide range of inputs as described in the previous point, root causes can be identified in the cell with the issue itself, or in a neighboring cell, or in a connection between cells. Identified root causes are in the form of floating-point values which describe how much each cell (source or neighbor) and each KPI within that cell contributes to the issue.

Some of the embodiments disclosed herein find common root-cause patterns that appear in the network. These patterns can be identified and labeled by experts which simplifies future analyses and allows for easier human-readable conclusions.

Some of the embodiments disclosed herein include an innovative cell neighborhood contribution model that pinpoints the cells that are contributing to each issue by combining explainable AI techniques with deep learning models designed for graph-structured data.

The model architecture used in the embodiments disclosed herein is agnostic to the order in which neighboring cells are supplied, eliminating the need for any kind of ranking.

Some of the embodiments disclosed herein allow the source cell to be handled differently from neighboring cells. A source cell may have different input KPIs (both quantity and type) from the neighbors, while the resulting contribution is directly comparable to the neighbor's contributions.

Previous methods that are oftentimes based on predefined rules and thresholds are not as robust/adaptable as the automated handling of both features and neighbor interactions in embodiments disclosed herein, which are more flexible because they allow for an arbitrary number and variety of features/neighbors, with no restrictions on the time-sampling of the data set employed or its network-specific characteristics, and providing adaptability to data sets from multiple operators.

An advantage of some of the embodiments disclosed herein is that they provide an end-to-end solution that constructs a network graph, identifies issues, provides detailed information on the causes of the issues, and identifies common root causes in the network. Further advantages of the embodiments disclosed herein is that they isolate source cell versus neighbor cell contribution for a given issue in the network (ranks neighbor cell contributions to pinpoint which cell interactions are causing issue), and determine what types of cell interactions are causing a given issue in the network (e.g., poor handover performance between cells A and B, too much load on cells C and D, etc.).

A further advantage of some of the embodiments disclosed herein is that they provide an automated way to determine which KPIs are most relevant for a given type of issue. Some of the embodiments disclosed herein provide a novel approach to break network graph into smaller sub-graphs to improve processing efficiency. Some of the embodiments disclosed herein are adaptable to multiple networks with varying network performance metrics, and to multiple types of issues.

According to a first aspect, a computer-implemented method for analyzing issues in a cellular network is provided. The cellular network includes a plurality of cells and wherein the plurality of cells includes source cells and neighbor cells The method includes obtaining data for each cell of the plurality of cells. The method further includes building a network graph, using the data obtained, representing features of the cells, wherein, for each source cell, each neighbor cell of the source cell is ranked based on the data obtained for the neighbor cell. The method further includes identifying, using the network graph, sub-graphs for each source cell indicating a network issue, wherein each sub-graph represents features of the source cell and a set of neighbor cells selected based on rank and features of the neighbor cells. The method further includes, for each network issue of the source cell for each sub-graph, ranking each feature for each neighbor cell represented in the sub-graph for the source cell and identifying a set of ranked neighbor features. The method further includes, for each network issue of the source cell for each sub-graph, ranking each feature of the source cell for each sub-graph and identifying a set of ranked source features. The method further includes identifying, using the set of ranked neighbor features and the set of ranked source features, a feature set for all subgraphs, wherein the feature set includes all or a reduced set of features. The method further includes, for each source cell, training, using the feature set identified, a first machine learning (ML) model for each neighbor cell in the set of neighbor cells for the source cell and determining a neighbor contribution value, for each neighbor cell, representing the contribution of the neighbor cell to the network issue. The method further includes, for each source cell, training, using the feature set identified, the first ML model for the source cell and determining a source contribution value for the source cell representing the contribution of the source cell to the network issue. The method further includes, for each network issue for each source cell, using the neighbor contribution values and source contribution values to identify a set of contributing features from the feature set identified that contribute to the network issue. The method further includes building, using the set of contributing features, a clustering model having a plurality of clusters, wherein each cluster identifies a pattern of one or more neighbor cells contribution to the source cell network issue. The method further includes training a second ML model, using the patterns identified by each cluster, to classify an unidentified pattern of one or more neighbor cells contribution to the source cell network issue and identify root cause information for the issue.

In some embodiments, the data obtained for each cell of the plurality of cells relates to performance metrics, cell configuration information, cell relation information and an operating condition, and wherein the features of the cells represented in the network graph relates to performance metrics, cell configuration information, cell relation information and an operating condition. In some embodiments, the root cause information for the issue identified includes identifying one or more of: the neighbor cells involved in causing the network issue, performance metrics for the neighbor cells involved in causing the network issue, cell relation information for neighbor cells involved in causing the network issue, and operating condition data for neighbor cells involved in causing the network issue.

In some embodiments, at least some of the obtained data for each cell of the plurality of cells relating to performance metrics, cell configuration information, cell relation information, and an operating condition is time-sampled data. In some embodiments, the performance metrics for the source cell and the neighbor cells of the source cell includes one or more of: cell key performance indicators (KPIs) having performance data for each source cell and the neighbor cells of the source cell, and relationship KPIs having performance data of the interactions from the source cell to the neighbor cells of the source cell and from the neighbor cells to the source cell.

In some embodiments, the cell configuration information and cell relation information for the source cell and the neighbor cells of the source cell includes one or more of: physical proximity, relation level performance metrics, relation level configuration information, and overlap. In some embodiments, the operating condition for the source cell and the neighbor cells of the source cell includes one or more of: normal conditions and network issues.

In some embodiments, building the network graph includes generating a first matrix and a second matrix with one or more of the performance metrics, cell configuration, cell relation, and operating condition features of the cells, wherein the first matrix includes vectors of cell key performance indicators (KPIs) having performance data for each source cell and the neighbor cells of the source cell, and the second matrix includes vectors of relationship KPIs having performance data of the interactions from the source cell to the neighbor cells of the source cell and from the neighbor cells to the source cell.

In some embodiments, the maximum number of neighbor cells in the set of neighbor cells selected based on rank is not determined. In some embodiments, the maximum number of cells, excluding the source cell, for each sub-graph is not determined.

In some embodiments, ranking each feature for each neighbor cell represented in the sub-graph for the source cell includes generating a neighbor feature matrix ranking each feature for each neighbor cell represented in the sub-graph for the source cell, and the set of ranked neighbor features is identified based on the neighbor feature matrix generated.

In some embodiments, generating the neighbor feature matrix and identifying a set of ranked neighbor features includes training a third ML model, generating Shapley Additive Explanations (SHAP) calculations, using the SHAP calculations to obtain a list of neighbor cell feature importance for each feature, and culling features from the list based on the calculated importance, and wherein the third ML model is one of: a neural network (NN), graph neural network (GNN), and a graph attention network (GAT).

In some embodiments, ranking each feature of the source cell for each sub-graph includes generating a source feature matrix, and the set of ranked source features is identified based on the source feature matrix generated.

In some embodiments, generating the source feature matrix and identifying a set of ranked source features includes training a random forest model, generating Shapley Additive Explanations (SHAP) calculations, using the SHAP calculations to obtain a list of source cell feature importance for each feature, and culling features from the list based on the calculated importance.

In some embodiments, the first ML model is one of: a neural network, a graph neural network (GNN), a graph convolutional network (GCN), and a relational graph convolutional network (R-GCN).

In some embodiments, training the first ML model and determining a neighbor contribution value includes applying to each neighbor cell independently two stacked dense layers of the first ML model. In some embodiments, training the first ML model and determining a source contribution value includes applying to each source cell independently two stacked dense layers of the first ML model.

In some embodiments, identifying the set of contributing features includes filtering the neighbor contribution values and source contribution values in the form of SHAP vectors and reducing the dimensionality of the SHAP vectors using principal components analysis. In some embodiments, the clustering model is built using hierarchical density-based spatial clustering of applications with noise (HDBSCAN).

In some embodiments, the second ML model is one of: a neural network (NN) and a multi-layer neural network, and wherein the output layer uses a sigmoid function. In some embodiments, a label is assigned to each cluster to identify the pattern, and training the second ML model using the patterns identified by each cluster includes using the assigned labels.

In some embodiments, the method further includes obtaining, using the set of contributing source features to the network issue, insights for the root cause information for the network issue. In some embodiments, the method further includes obtaining, using the set of contributing neighbor features to the network issue, insights for the root cause information for the network issue.

According to a second aspect, an apparatus is provided. The apparatus includes processing circuitry and a memory containing instructions executable by the processing circuitry for analyzing issues in a cellular network, wherein the cellular network includes a plurality of cells and wherein the plurality of cells includes source cells and neighbor cells. The apparatus operative to obtain data for each cell of the plurality of cells. The apparatus is further operative to build a network graph, using the data obtained, representing features of the cells, wherein, for each source cell, each neighbor cell of the source cell is ranked based on the data obtained for the neighbor cell. The apparatus is further operative to identify, using the network graph, sub-graphs for each source cell indicating a network issue, wherein each sub-graph represents features of the source cell and a set of neighbor cells selected based on rank and features of the neighbor cells. The apparatus is further operative to, for each network issue of the source cell for each sub-graph, rank each feature for each neighbor cell represented in the sub-graph for the source cell and identify a set of ranked neighbor features. The apparatus is further operative to, for each network issue of the source cell for each sub-graph, rank each feature of the source cell for each sub-graph and identify a set of ranked source features. The apparatus is further operative to identify, using the set of ranked neighbor features and the set of ranked source features, a feature set for all sub-graphs, wherein the feature set includes all or a reduced set of features. The apparatus is further operative to, for each source cell, train, using the feature set identified, a first machine learning (ML) model for each neighbor cell in the set of neighbor cells for the source cell and determine a neighbor contribution value, for each neighbor cell, representing the contribution of the neighbor cell to the network issue. The apparatus is further operative to, for each source cell, train, using the feature set identified, the first ML model for the source cell and determine a source contribution value for the source cell representing the contribution of the source cell to the network issue. The apparatus is further operative to, for each network issue for each source cell, use the neighbor contribution values and source contribution values to identify a set of contributing features from the feature set identified that contribute to the network issue. The apparatus is further operative to build, using the set of contributing features, a clustering model having a plurality of clusters, wherein each cluster identifies a pattern of one or more neighbor cells contribution to the source cell network issue. The apparatus is further operative to train a second ML model, using the patterns identified by each cluster, to classify an unidentified pattern of one or more neighbor cells contribution to the source cell network issue and identify root cause information for the issue.

According to a third aspect, a computer program is provided comprising instructions which when executed by processing circuitry causes the processing circuitry to perform the method of any one of the embodiments of the first aspect.

According to a fourth aspect, a carrier is provided containing the computer program of the third aspect, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
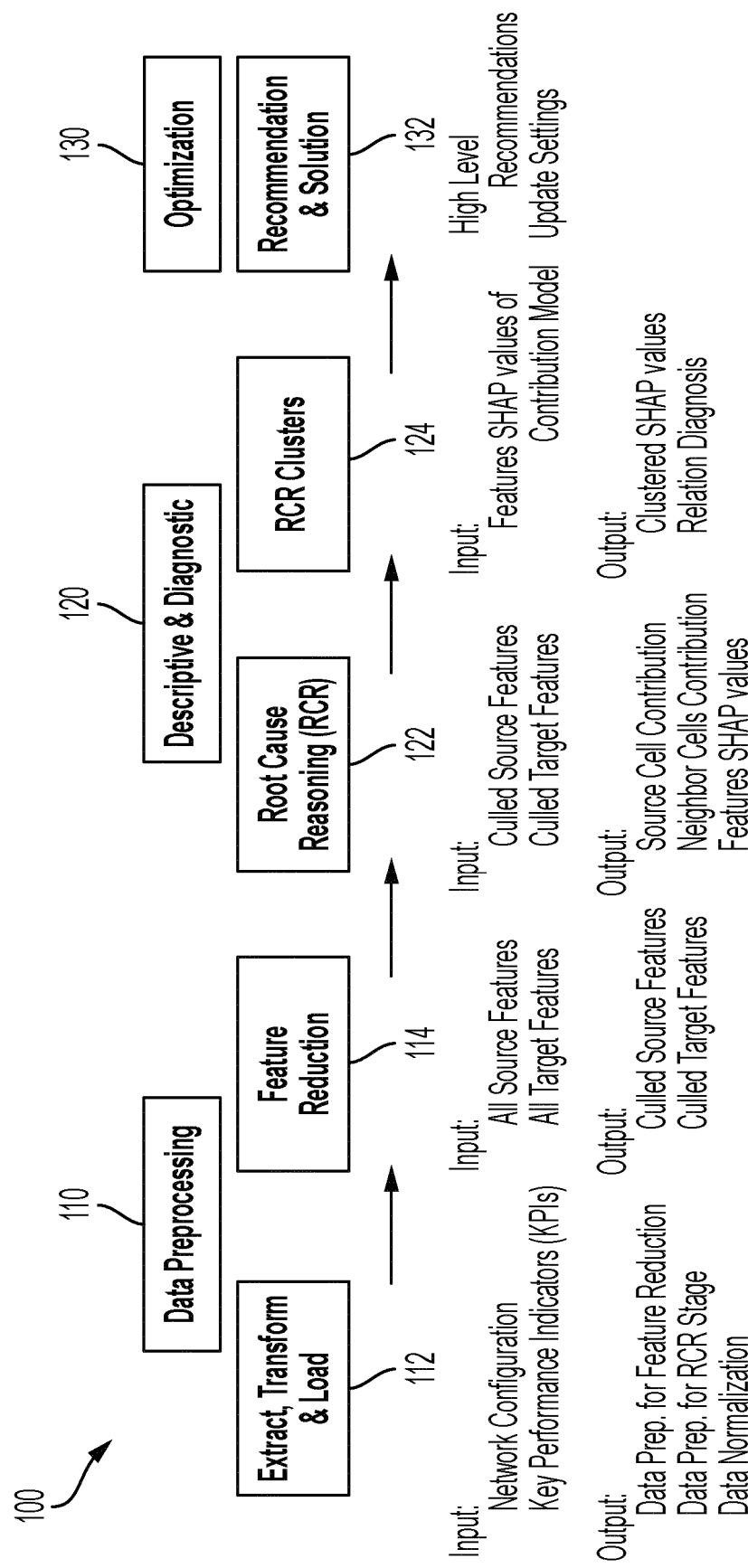
FIG. 1 is a block diagram illustrating an architecture for automated root cause analysis of network issues in a cellular network according to an embodiment.

FIG. 1 is a block diagram illustrating an architecture 100 for automated root cause analysis of network issues in a cellular network according to an embodiment. In some embodiments, the architecture 100 includes a data preprocessing module 110, a descriptive and diagnostic module 120, and an optimization module 130.

In some embodiments, the data preprocessing module 110 includes an extract, transform, and load module 112 and a feature reduction module 114. Data inputs to the extract, transform, and load module 112 may include network configuration data and key performance indicators (KPIs) data. The data outputs from the extract, transform, and load module 112 may include data preprocessed for feature reduction, data preprocessed for root cause reasoning (RCR) stage, and data normalization.

In some embodiments, the preprocessing of data is performed in accordance with the disclosures in Appendix A, which includes Publication No. WO 2019/233635 A1 and WO 2020/164739 A1. Appendix A includes disclosures that provide methods for the detection of cell conditions in a wireless cellular network, and the training of a classifier model to detect cell conditions in a wireless cellular network. The disclosed methods comprise: obtaining time-series data for a plurality of performance metrics for each cell of a plurality of cells of the wireless cellular network; converting the time-series data to respective image data sets for each cell of the plurality of cells; classifying the image data sets into one of a plurality of predefined cell conditions; and applying a ML algorithm to training data comprising the classified image data sets to generate a classifier model for classifying image data sets into one of the plurality of predefined cell conditions. The disclosures also provide methods for generating and training a model to detect interference conditions at a cell in a wireless cellular network and to classify the impact of detected interference conditions on performance of the wireless cellular network in the cell. The disclosed methods comprise: for each of a plurality of cells in the wireless cellular network, obtaining data representing received signal power at a base station serving the cell over a period of time and obtaining data representing a plurality of performance metrics for the cell over the time period; obtaining classifications of the received signal power data into one of a plurality of cell interference conditions and the performance metric data into one of a plurality of cell impact classes; and applying a Multi-Task Learning ML algorithm to a training data set comprising the classified received signal power and performance metric data to generate a model for classifying received signal power data into one of the plurality of cell interference conditions and for classifying performance metric data into one of the plurality of cell impact classes.

In some embodiments, data input to the feature reduction module 114 may include all source features and all target features. The data outputs from the feature reduction module 114 may include culled source features and culled target features.

In some embodiments, the descriptive and diagnostic module 120 includes a root cause reasoning (RCR) module 122 and a RCR clusters module 124. Data inputs to the RCR module 122 may include culled source features and culled target features. The data outputs from the RCR module 122 may include source cell contribution, neighbor cells contribution, and features SHAP values. Data inputs to the RCR clusters module 124 may include features SHAP values of contribution model. The data outputs from the RCR clusters module 124 may include cluster SHAP values and relation diagnosis.

In some embodiments, the optimization module 130 include a recommendation and solution module 132. In some embodiments, the recommendation and solution module 132 outputs high level recommendations and update settings.

Figure 2:
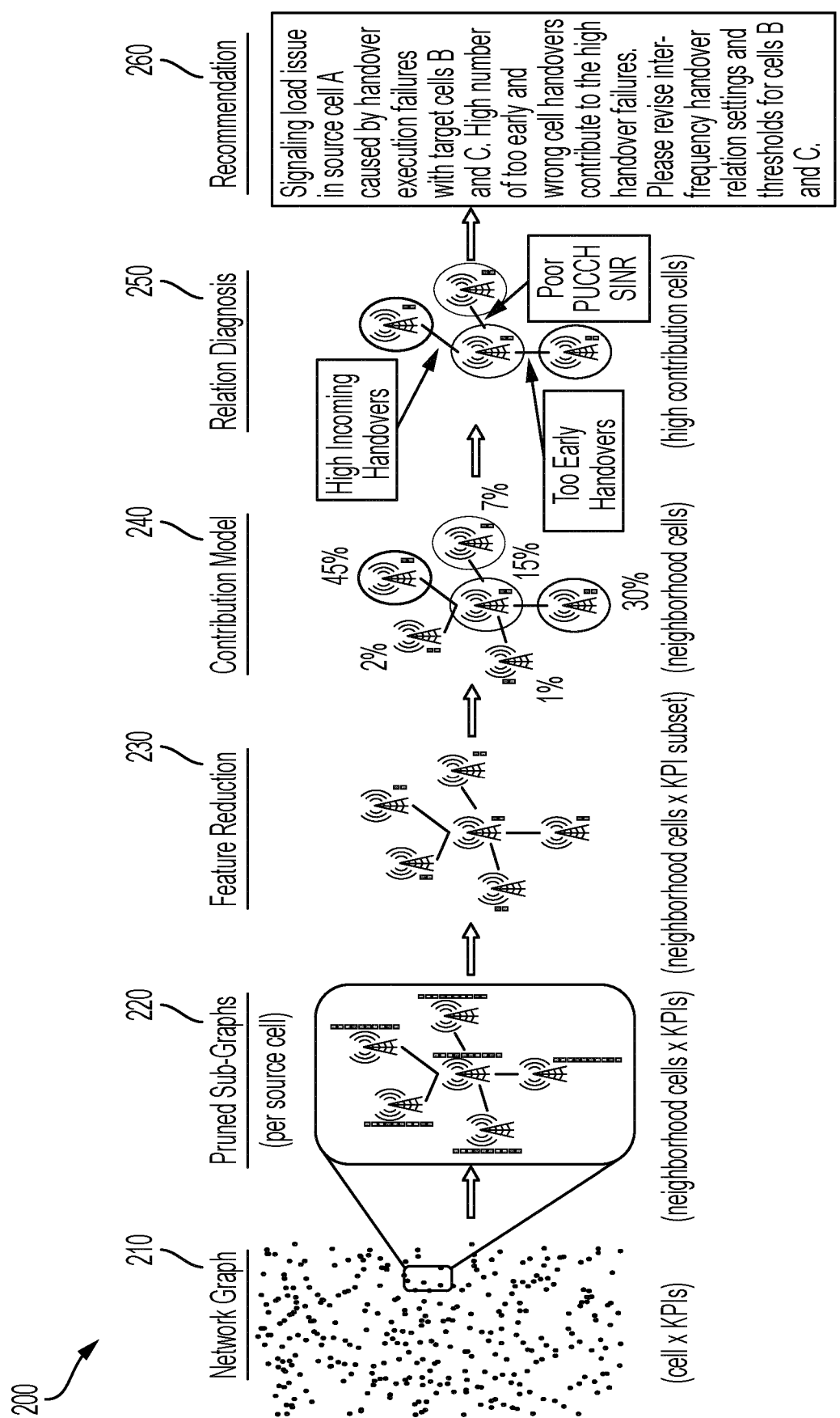
FIG. 2 is a block diagram illustrating an architecture and a process for automated root cause analysis of network issues in a cellular network according to an embodiment.

FIG. 2 is a block diagram illustrating an architecture and a process for automated root cause analysis of network issues in a cellular network according to an embodiment. The architecture and process illustrated in FIG. 2 provides an automated end-to-end analysis of the root causes for issues in cellular networks. In some embodiments, this is achieved by combining explainable Artificial Intelligence (AI) techniques with deep learning models designed for graph-structured data. The disclosed method provides the relative contribution of each network cell to a given issue, and further, identifies the specific types of relationships between two cells that are leading to the poor performance. By considering the detailed interactions between network cells, the disclosed method provides a marked improvement over previous solutions for cell issue root cause analyses that oftentimes neglect some relevant information from neighboring cells.

Referring to FIG. 2, each step in an exemplary embodiment of the disclosed method is illustrated. At each successive step, the method hones in on the issue's root cause by reducing the input data dimensionality (as shown in parentheses under each step) and discarding irrelevant information. Network Graph 210 is created from a cell network using domain specific environment information to create the edges. The network graph shows which cells are exchanging information and lists hundreds of KPIs related to each cell's performance. Pruned Sub-Graphs 220 are identified by pruning the input network graph by focusing on only the local neighborhood surrounding the cell where an issue has been detected. Next, Feature Reduction 230 is performed to select a top percentile of the input KPIs that best distinguish the given issue from normal cells. For the Contribution Model 240, the pruned graph and KPI subset are passed to a graph classification model that determines the relative contribution of each cell and their neighborhood cells to the issue. The significance of the KPIs from the source cell and each corresponding neighbor cells is also determined. Relation Diagnosis 250 then occurs by passing the relationships between the issue's source cell and the highest contributing neighbor cells to a relationship classifier that diagnoses the types of cell relationships that are responsible for the issue. For Recommendation 260, the relation diagnosis is used to create a high-level recommendation that can be used to improve the performance of the affected cells. The disclosed method provides network engineers insights regarding which cells and what types of cell relationships are contributing to network issues, decreasing the overall time required to resolve issues.

Figure 3A:
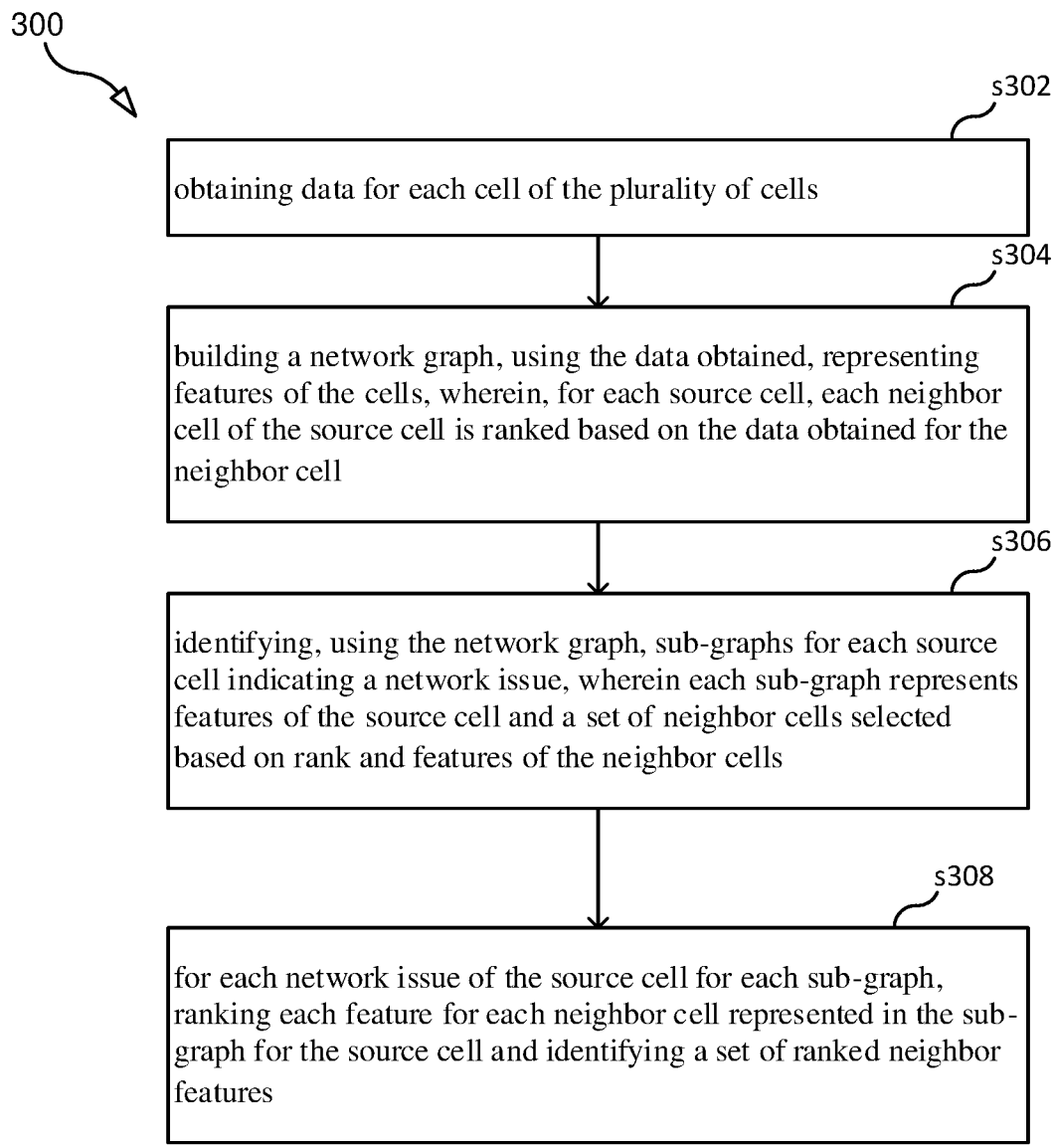
FIGS. 3A, 3B, and 3C are flow charts illustrating a process according to an embodiment.
Figure 3B:
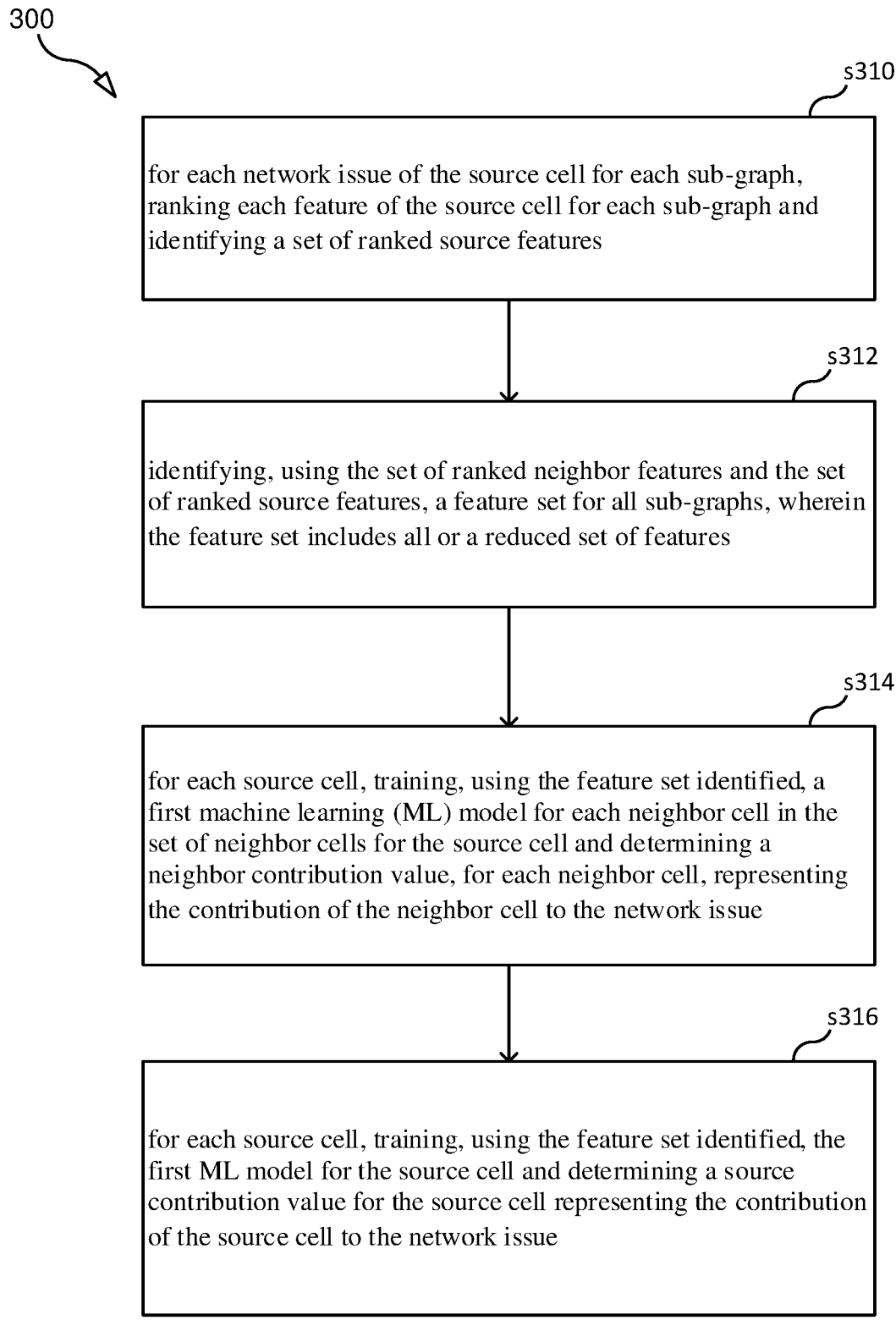
Figure 3C:
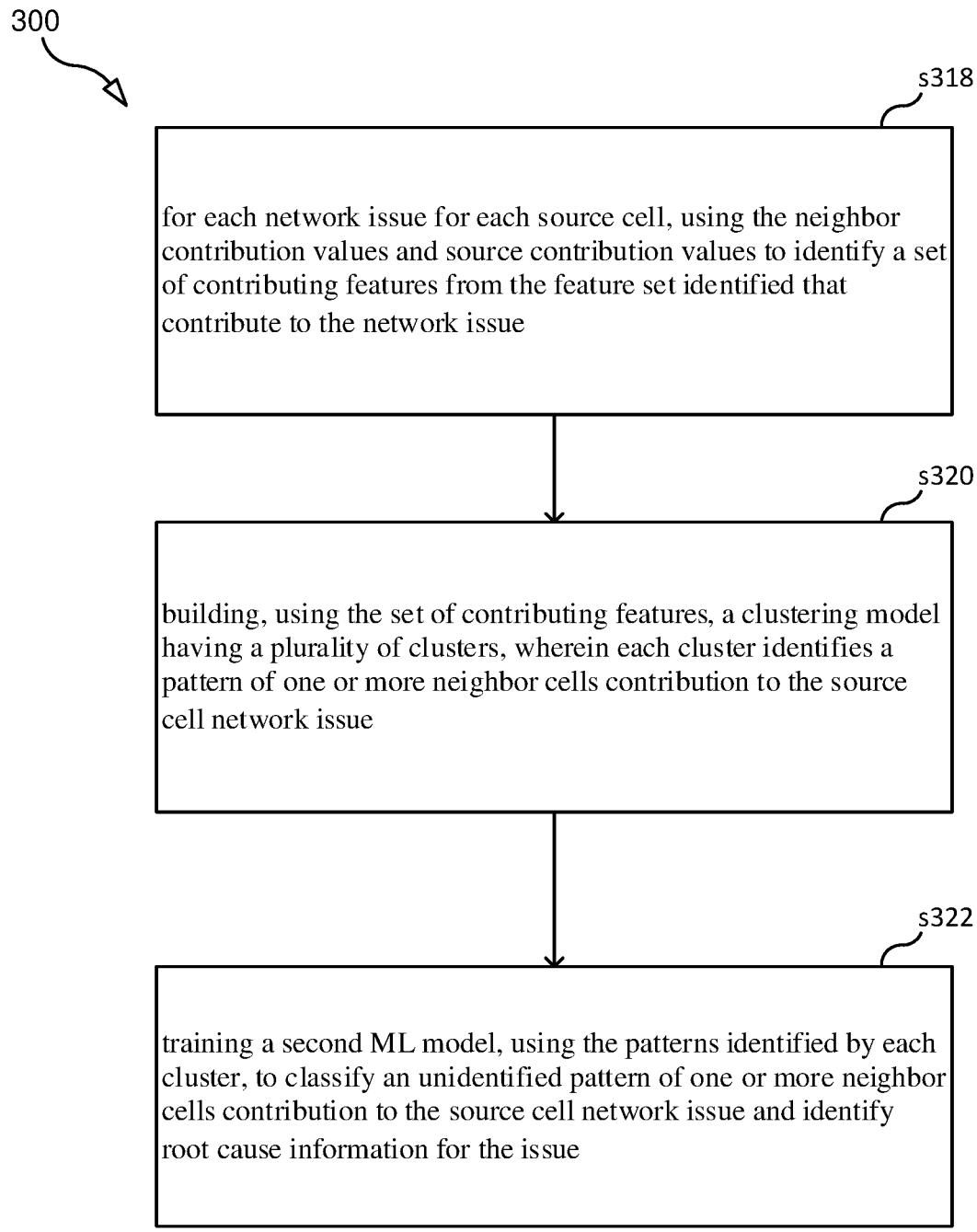

FIGS. 3A, 3B, and 3C are flow charts illustrating a process according to an embodiment. Process 300 is a computer-implemented method for analyzing issues in a cellular network, wherein the cellular network includes a plurality of cells and wherein the plurality of cells includes source cells and neighbor cells. Referring now to FIG. 3A, process 300 may begin with step s302.

Step s302 comprises obtaining data for each cell of the plurality of cells.

Step s304 comprises building a network graph, using the data obtained, representing features of the cells, wherein, for each source cell, each neighbor cell of the source cell is ranked based on the data obtained for the neighbor cell.

Step s306 comprises identifying, using the network graph, sub-graphs for each source cell indicating a network issue, wherein each sub-graph represents features of the source cell and a set of neighbor cells selected based on rank and features of the neighbor cells.

Step s308 comprises, for each network issue of the source cell for each sub-graph, ranking each feature for each neighbor cell represented in the sub-graph for the source cell and identifying a set of ranked neighbor features.

Referring now to FIG. 3B, process 300 may continue with step s310. Step s310 comprises, for each network issue of the source cell for each sub-graph, ranking each feature of the source cell for each sub-graph and identifying a set of ranked source features.

Step s312 comprises identifying, using the set of ranked neighbor features and the set of ranked source features, a feature set for all sub-graphs, wherein the feature set includes all or a reduced set of features.

Steps s314 comprises, for each source cell, training, using the feature set identified, a first machine learning (ML) model for each neighbor cell in the set of neighbor cells for the source cell and determining a neighbor contribution value, for each neighbor cell, representing the contribution of the neighbor cell to the network issue.

Step s316 comprises, for each source cell, training, using the feature set identified, the first ML model for the source cell and determining a source contribution value for the source cell representing the contribution of the source cell to the network issue.

Referring now to FIG. 3C, process 300 may continue with step s318. Step s318 comprises, for each network issue for each source cell, using the neighbor contribution values and source contribution values to identify a set of contributing features from the feature set identified that contribute to the network issue.

Step s320 comprises building, using the set of contributing features, a clustering model having a plurality of clusters, wherein each cluster identifies a pattern of one or more neighbor cells contribution to the source cell network issue.

Step s322 comprises training a second ML model, using the patterns identified by each cluster, to classify an unidentified pattern of one or more neighbor cells contribution to the source cell network issue and identify root cause information for the issue.

Assembling the Network Graph

In an exemplary embodiment, an input network graph that summarizes the status and performance of the cellular network is built. The data obtained can be, for example, time-sampled data that is hourly-sampled data or time sampling over any time period. The network graph built according to the disclosed method may, in an exemplary embodiment, list which cells in a network are "related" to one another (edges in the graph), in terms of their physical proximity, number of handovers exchanged, and the overlap between their transmission beams and frequencies. Cells that are cosite are automatically considered to have a relationship with one another. All other cell relationships may be ranked, for example, based on the following process:

All neighbors start with rank=0

If distance to neighbor is less than the average distance between source cell and all its neighbors: +2

If distance to neighbor is lower than 500 meters: +2 rank+(hoContribution of neighbor)*0.2 (where hoContribution is the percentage of the source cell's total handovers exchanged with this neighbor)

rank+overlap_factor*20 (where overlap_factor varies from 0-1 and is a measure of how much the source and neighbor cell's beams overlap)

If source and neighbor are intra frequency: +3

If neighbor is blocked from handing over to the source cell: +1 (this signifies that there is a known issue with the neighbor cell that could be affecting the source cell)

The neighboring cells with a higher rank are deemed more influential to a given source cell's status. The edges in the resulting network graph are the top-K ranking neighbor cells, that rank higher than a cutoff value.

The network graph built according to the disclosed method may, in an exemplary embodiment, provides a feature matrix of hundreds of KPIs for each cell in the network. This includes both cell and relationship KPIs, such as, for example:

Cell KPIs: Details the performance of each cell during the sampled hour. Represented by a vector of KPIs. This is in the form of the source cell and the neighbor cells.

Relationship KPIs: Captures performance of the interactions between each related cell. Relationship KPIs are bi-directional, including KPIs related to interactions from the source cell to the neighbor cell (source-to-neighbor KPIs) and KPIs related to interactions from the neighbor to the source cell (neighbor-to-source KPIs). Represented by a vector of KPIs, where source-to-neighbor and neighbor-to-source KPIs are treated as separate KPIs.

Figure 4:
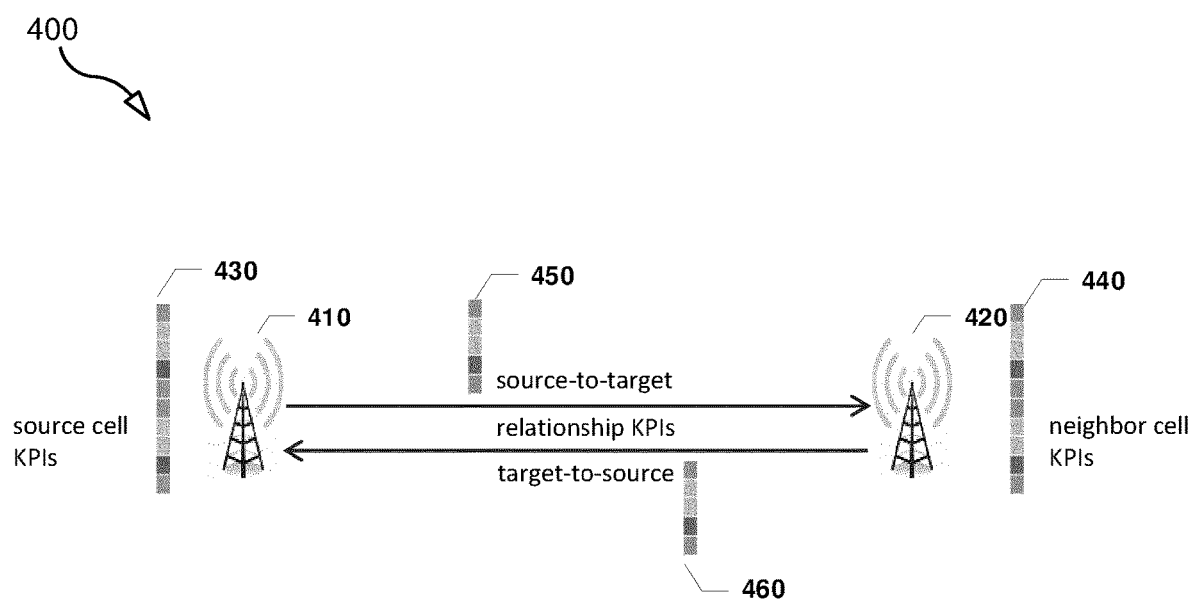
FIG. 4 illustrates source cell, neighbor cell, and relationship KPIs according to an embodiment.

FIG. 4 illustrates source cell, neighbor cell, and relationship KPIs according to an embodiment. With reference to the illustration 400 of FIG. 4, a source cell 410 and a neighbor cell 420 are shown. The feature matrix used in an exemplary embodiment of the disclosed method includes source cell KPIs 430, neighbor cell KPIs 440, source-to-target relationship KPIs 450, and target-to-source relationship KPIs 460.

All KPIs may, for example, then be normalized between 0 and 1 following a per-operator normalization scheme to generalize better between networks of varying performance and configuration.

The network graph built according to the disclosed method may, in an exemplary embodiment, indicate which cells had a detectable issue during the sampled period (e.g., 1 hour) and which cells were operating under normal conditions (i.e., no issue). Cells are identified as having one or more issues related to cell performance.

The network graph data is encompassed in two matrices. One 2D matrix of size (# cells, # cell KPIs+ # of cell issues) containing the features and issue classification of each cell in the network. The other matrix is of size (# relationships, # relationship KPIs) and denotes which cells have a relationship along with the KPIs for those relationships.

Pruning into Sub-Graphs

In an exemplary embodiment, after the network graph is built, the full graph may be pruned into an array of sub-graphs localized onto each source cell. Each sub-graph includes only the source cell's cosite cells and its top-K ranked neighbor cells based on the ranking described above. In some embodiments, K=12 to include the maximum top-12 ranked neighbor cells.

Depending on the local network configuration, the number of cosite cells and the number of related neighbor cells varies for a given source cell. Thus, the total number of cells included in each sub-graph also varies. In some embodiments, the sub-graphs are limited to, for example, a maximum of 24 cells, excluding the source cell itself. In the rare case of a source cell having more than 24 cosite neighbors, 24 of its cosite neighbors are randomly sampled to build the sub-graph. In cases where a source cell has fewer than 24 total cosite plus top-K ranked related cells, the sub-graph is zero-padded up to 24 neighbors.

Figure 5A:
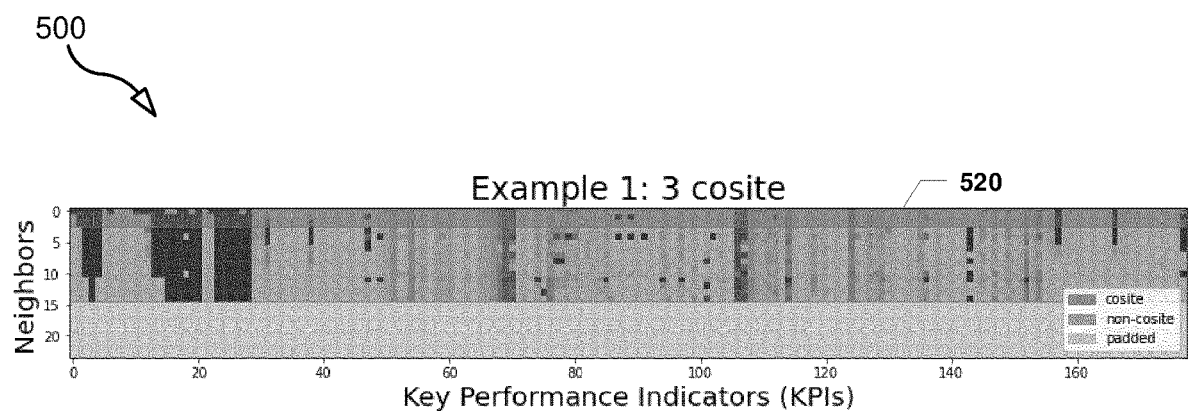
FIG. 5A illustrates a sub-graph feature plot matrix for an example according to an embodiment.
Figure 5B:
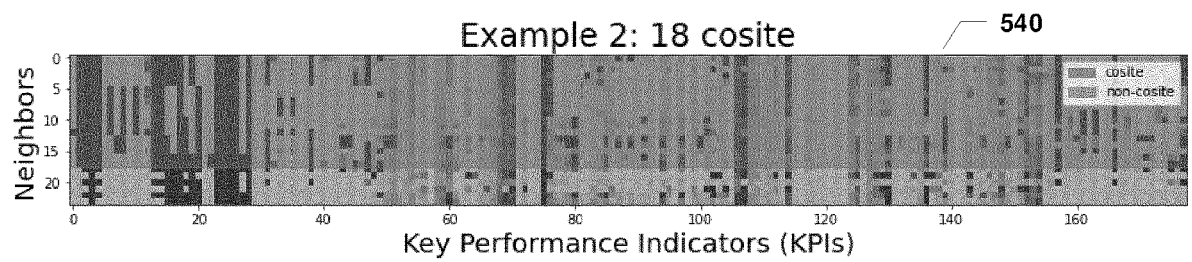
FIG. 5B illustrates a sub-graph feature plot matrix for an example according to an embodiment.

FIGS. 5A and 5B each illustrate a sub-graph feature plot matrix 500 for an example according to an embodiment, summarizing the graph pruning process for three different scenarios. Each example has a pruned sub-graph feature plot matrix of size (24 neighbors, 180 cell+relation KPIs), but with varying ratios of cosite, non-cosite, and zero-padded neighbors depending on their local network environment. FIG. 5A illustrates a sub-graph feature plot matrix 520 for a source cell with three cosite cells. After setting the maximum number of neighbors that build the neighbor matrix to 24, FIG. A represents a source cell for which the number of neighbors does not reach 24, and a padding approach is applied to build an image of 24 neighbors for the trained ML, which was trained with 24 neighbors. FIG. 5B illustrates a sub-graph feature plot matrix 540 for a source cell with 18 cosite cells. After setting the maximum number of neighbors that build the neighbor matrix to 24, FIG. 5B represents a normal source cell with more than 24 neighbors, where a ranking has been applied to select the 24 most important neighbors. FIG. 5B represents a source cell with a matrix of 24 neighbors, where 18 of them are at the same site of the source cell, and 6 of them are at a different site than the source cell.

As part of the pruning to identify the sub-graphs, the cell and relationship KPIs for each neighbor may be concatenated, resulting in a single feature matrix for each sample. The graph pruning process decreases the input data size into the ML models and helps the ML model focus on only the most relevant neighbor cells when trying to determine the root cause of a given issue. The uniform dimensionality of each sub-graph feature matrix also allows models to be trained using batches of sub-graphs, improving the efficiency of ML model training.

Feature Reduction

Pruning the input network graphs into sub-graphs reduces the overall number of neighbors considered by the ML model but does not reduce the dimensionality of the KPI axis of the feature matrices. To reduce the input KPI dimensionality and further focus subsequent ML models on only the most relevant features to various network issues, a KPI feature reduction can be performed.

Figure 6:
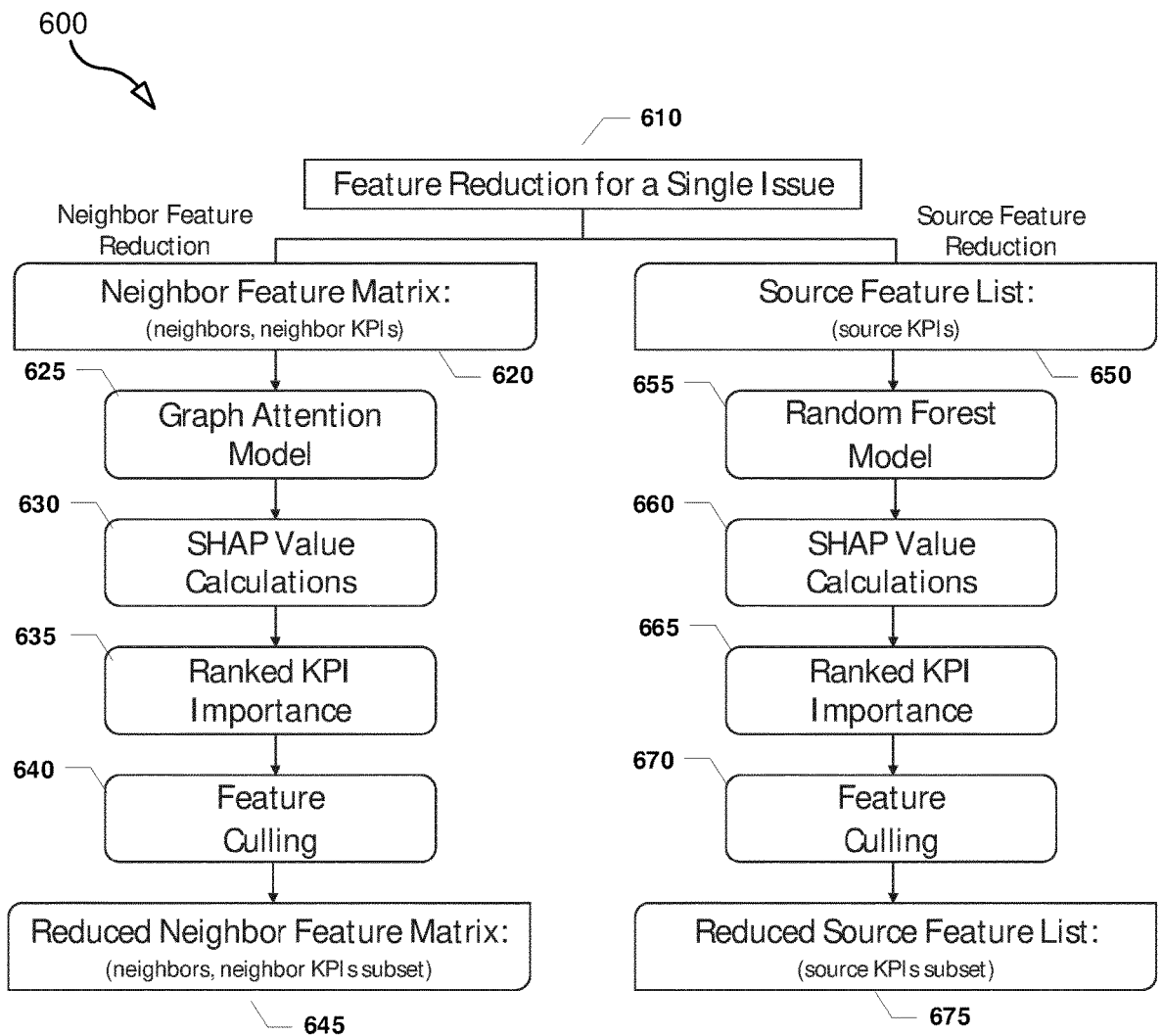
FIG. 6 is block diagram illustrating the process for neighbor feature reduction and source feature reduction according to an embodiment.

FIG. 6 is block diagram illustrating the process 600 for neighbor feature reduction and source feature reduction according to an embodiment. As shown in FIG. 6, the feature reduction for each network issue is performed in two separate branches: one branch for neighbor cell features (which includes both source-to-neighbor and neighbor-to-source relationship features) and another branch for source cell features.

Neighbor Cell Feature Reduction

The feature reduction, in some embodiments, relies on a ranking technique called SHAP, which calculates a relative feature importance for a given sample by iteratively hiding features from the ML model and observing the change in the ML model's output prediction for that sample. If the ML model's prediction for a sample is significantly altered when a feature is absent, that feature is deemed important to the ML model's decision-making. The result of the SHAP analysis is that each input feature is assigned a SHAP value, which can be interpreted as the average effect of the feature on the ML model's output prediction. If the SHAP analysis reveals that the presence of the feature increases the ML model's output prediction, the feature is given a positive SHAP value. Conversely, if the presence of the feature decreases the ML model's output prediction, the feature is given a negative SHAP value.

To use the SHAP technique for feature ranking, a ML model can be trained that will be used for the SHAP analysis. For the neighbor cell feature ranking 620, a GNN that takes graph-structured data as input can be used. In some embodiments, the GNN used is a GAT model 625, which is a specific type of GNN with an attention mechanism that attempts to learn the signatures of relevant neighbor nodes for a particular classification. For instance, if cosite cells are more useful for a given classification task, the attention mechanism allows the algorithm to learn that it should weight more heavily cosite neighbor cells rather than non-cosite cells.

In step 625, for a given issue, the GAT is first trained for binary classification to distinguish the sub-graphs of normal source cells from those of source cells with the selected issue. After training, SHAP analysis 630 is performed on a hold-out test set for SHAP value calculations.

Figure 7:
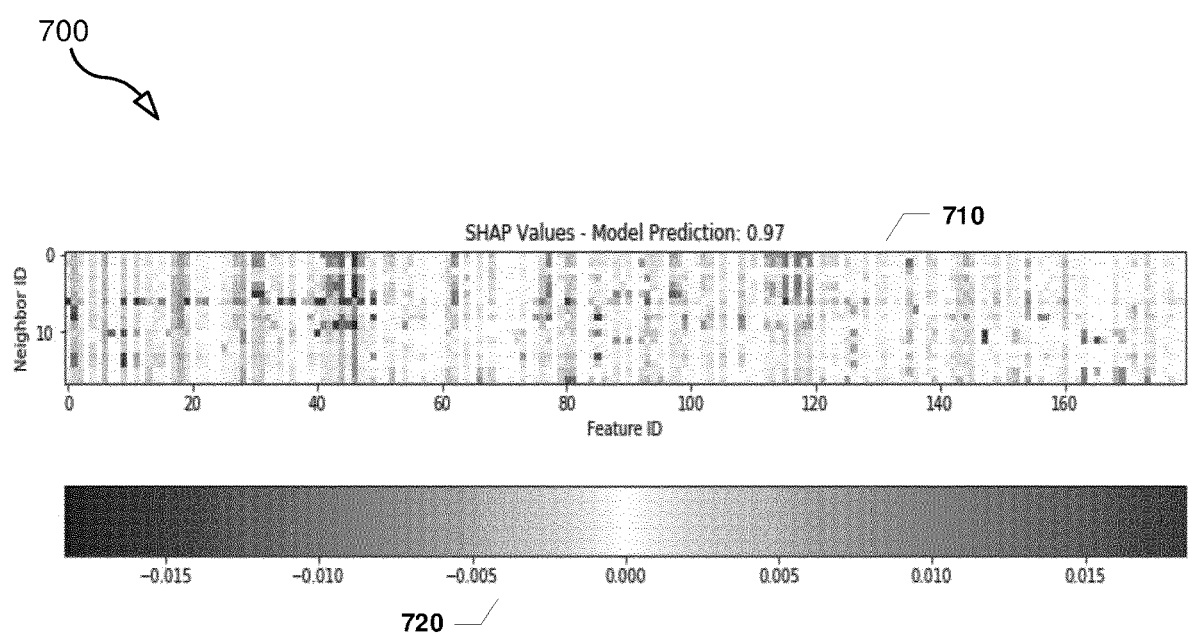
FIG. 7 illustrates a feature plot matrix of SHapley Additive exPlanations (SHAP) values for a single sample for an example according to an embodiment.

Referring now to FIG. 7, feature plot matrix 700 of SHAP values for a single sample for an example according to an embodiment is illustrated. Darker (non-white) columns indicate features with high importance for this sample's classification, while darker (non-white) rows indicate important neighbors for this sample's classification. 710 is an image representation of the contribution evaluation done by the SHAP analysis. Each pixel in the image represents an evaluated feature of the collection of source and neighbor features. Each pixel will have an intensity color representation, where the darker the color, the more important towards the network issue or towards the normal state, while the lighter the color the more irrelevant the feature is as a contribution feature to the network issue. 720 is a color gradient scheme of the image 710. The darker the color, the more important towards the network issue or towards the normal state, while the lighter the color the more irrelevant the feature is as a contribution feature to the network issue.

Referring now to FIG. 6, at step 635, the following operation over the hold-out test set SHAP values is performed to obtain a final ranked list of KPI importance:

$$KPI_{importance} = \frac{1}{n+s} \sum_{j=0}^{s} \sum_{i=0}^{n} |SHAP_{i,j}| \quad \text{(Eq. 1)}$$

Where (n) is the total number of neighbors and (s) is the total number of samples in the hold-out test set. This operation is repeated over all input KPIs to obtain an importance for each feature.

Figure 8:
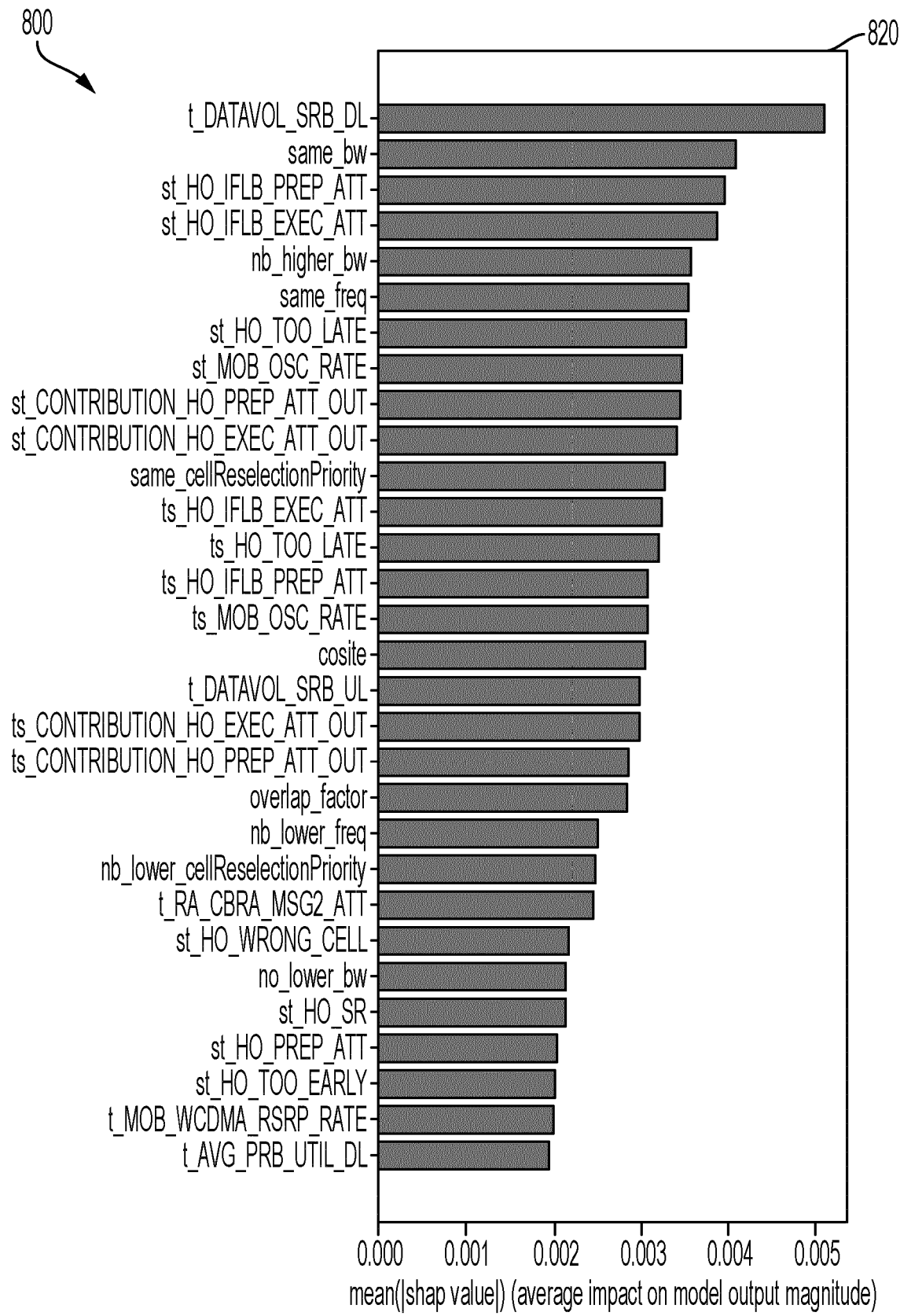
FIG. 8 illustrates bar charts ranking neighbor cell features and source cell features for an example according to an embodiment.
Figure 8:
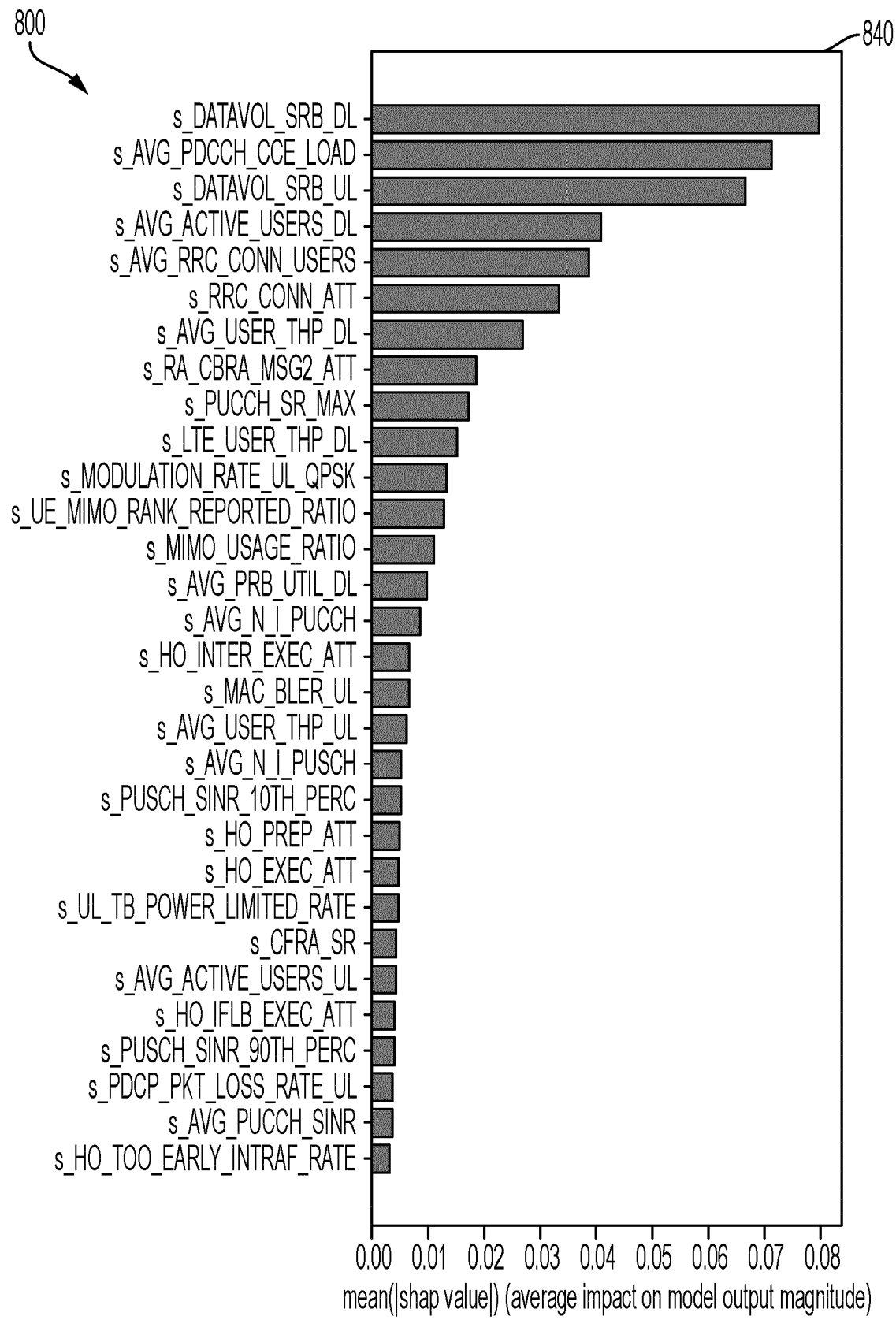

Referring now to FIG. 8, bar charts 800 ranking neighbor cell features and source cell features for an example according to an embodiment are illustrated. Bar chart 820 shows an example of the top 30 ranked features produced for a signaling load issue using the described feature ranking method for neighbor cell features. Bar chart 840 shows an example of the top 30 ranked features produced for a signaling load issue using the described feature ranking method for source cell features. The longer the bar, the higher its relevance in the feature evaluation process.

Referring now to FIG. 6, the final step 640 in the feature reduction involves culling features from the KPI list based on their calculated importance. This is done by taking the top m features, where m is the number of features that cumulatively possess 80% of the total SHAP KPI importance. Finally, all culled KPIs are removed from the neighbor feature matrices of all samples. The final, reduced neighbor feature matrices 645 are then passed on as input to the next step of the disclosed method (the contribution model).

Source Cell Feature Reduction

The pruned sub-graphs contain only the information of a source cell's neighbors and exclude the source cell's own KPIs. Thus, referring to FIG. 6 and step 650, a separate feature reduction on source cell KPIs is performed. Since the source cell KPIs are 1D rather than a graph such as GNN, a random forest model 655 is used in this branch of the feature reduction module. At step 655, a random forest model is trained on a binary classification task, with the output classes again being a normal source cell versus a source cell with the selected issue.

After training, at step 650, a SHAP analysis is performed on a holdout test set and, at step 655, a ranked feature list is created from the calculated SHAP values. In this case, however, each KPI's importance is calculated by averaging over the absolute SHAP values for that KPI across all test set samples (i.e., Equation 1 where n=0). Referring now to FIG. 8, bar chart 840 shows an example of the top 30 ranked source cell features for a signaling load issue using the aforementioned feature ranking method. Finally, at step 670, only the top m features that cumulatively possess 80% of the total SHAP source cell KPI importance are selected. The final, reduced source cell feature arrays 675 are then passed on as input to the next step of the disclosed method (the contribution model).

Contribution Model

In an exemplary embodiment, a contribution model is used to classify a source cell as being normal or having an issue, and to identify which neighboring cells have had a greater contribution to that classification. The contribution model also considers the source cell to identify the cases when the root cause of the problem is in the source cell itself.

Figure 9:
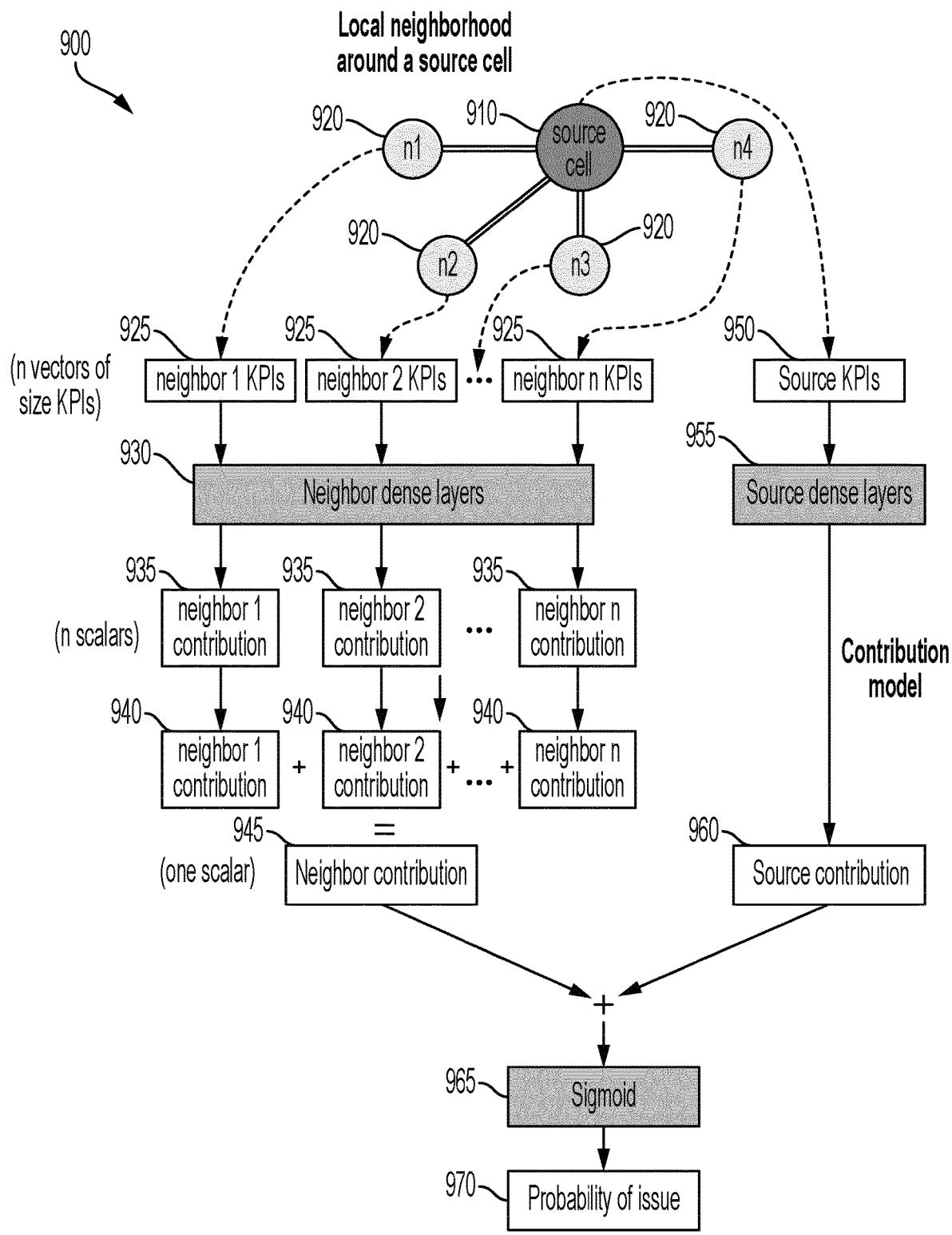
FIG. 9 is a block diagram illustrating an architecture and process for a contribution model according to an embodiment.

FIG. 9 is a block diagram illustrating an architecture and process 900 for a contribution model according to an embodiment. The model illustrated includes two branches of dense layers—neighbor dense layers 930 and source dense layers 955—, one branch for the neighbor cells 920 and one branch for the source cell 910. This allows different KPIs—neighbor KPIs 925 and source KPIs 950—to be considered for source and neighbor cells, and allows for a comparison of their individual contributions—neighbor contribution 935, 940, 945 and source contribution 950—to the source issue. Each branch of the contribution model contains two stacked dense layers—neighbor dense layers 930 and source dense layers 955—which are applied to each cell independently. The result of each branch is a single value—the contribution value (neighbor contribution 945 and source contribution 960)—which is then summed over all neighbor cells and the source cell before the sigmoid function 965 is applied. The full contribution model is trained to classify 970 normal/issue source cells. The contribution model in mathematical notation is described in Algorithm 1.

---

Algorithm 1 - Training Contribution Model for Root Cause Reasoning

---

Training data $\{x, y\} = \{(x_i, y_i)\}_{i=1}^{N}$, number of training examples $i \in \{1, 2 ... N\}$
K source KPIs, P target KPIs, M neighbor cells
Input: $x_i = (x_i^s, x_i^t)$, where
  Source KPIs
    $x_i^s = [x_{i1}^s, x_{i2}^s, ... , x_{iK}^s]$, $x_i^s \in \mathbb{R}^K$
  Neighbor KPIs
    $x_i^t = [x_i^{t1}, x_i^{t2}, ... , x_i^{tj}, ... , x_i^{tM}]$,  $x_i^t \in \mathbb{R}^{P \times M}$, $x_i^{tj} \in \mathbb{R}^P$
    where, $x_i^{tj} = [x_{i1}^{tj}, x_{i2}^{tj}, ... , x_{iP}^{tj}]$ $\forall j \in [1, ... , m]$
The forward pass of the contribution model (for a single sample):
    $y^{s1} = \text{relu}(W^{s1} x_i^s + b^{s1})$
    $y^{s,contrib} = \tanh(W^{s2} y^{s1} + b^{s2})$
    $y_j^{t1} = \text{relu}(W^{t1} x_j^t + b^{t1})$, $\forall j \in 1..n$
    $y_j^{t,contrib} = \tanh(W^{t2} y_j^{t1} + b^{t2})$, $\forall j \in 1..n$ -continued Algorithm 1 - Training Contribution Model for Root Cause Reasoning $$y = \sigma\left(y^{s,contrib} + \sum_{i=1}^{n} y_i^{t,contrib}\right)$$

Where the learned parameters (contribution model weights) are:
$W^{s1} \in R^{k_s,K}$,    $b^{s1} \in R^{k_s}$,    $W^{s2} \in R^{1,k_s}$,    $b^{s2} \in R^1$
$W^{t1} \in R^{k_t,P}$,    $b^{t1} \in R^{k_t}$,    $W^{t2} \in R^{1,k_t}$,    $b^{t2} \in R^1$
The scalars $k_s$ and $k_t$ are user-defined parameters. We set them to 16 and 32, respectively.
Expected Output: $y_i \in \{0,1\}$ $\forall$ $i \in [1, \ldots, N]$
  1. Initiate model weights, $W = \{W^{s1}, b^{s1}, W^{s2}, b^{s2}, W^{t1}, b^{t1}, W^{t2}, b^{t2}\}$ 2. $\min_W f(x, y) = -\frac{1}{N}\sum^{i=N}\left[y_i\left(\log\frac{1}{1+e^{-x_i}}\right) + (1-y_i)\left(1 - \log\frac{1}{1+e^{-x_i}}\right)\right]$ 3. While not converge
     |   For i ∈ [N], do
     |   |   W = W − α * ∇f($x_i$, $y_i$)
     |   end For
     end while
Actual Output: Weight, W, prediction probability for issue class $\hat{y}_i \in [0,1]$ $\forall$ $i \in 1, \ldots, N$ In an exemplary embodiment, the contribution model is trained using two levels of dropout. During training, all source KPIs are dropped out 20% of the time, all neighbor KPIs (all neighbors simultaneously) are dropped out 20% of the time, and all KPIs are included 60% the time. This prevents the contribution model from relying only on source/neighbor features, which provides more insight into contribution factors that are more subtle. The second level of dropout occurs at the input layer of the contribution model. 10% of all KPIs are dropped out at training. This is again to prevent the contribution model from focusing on only the high impact KPIs. Stratified sampling is used to account for class imbalance.

Once the contribution model is trained, the contribution model up can be used to the contribution layer to get the contributions from each cell. Due to the tanh activation, these contribution values are scalars in the range −1 to 1. Because the contribution model is trained with a sigmoid function with 1 corresponding to an issue, the positive contribution values mean the cells contribute to the issue, while the negative values mean contribution to normal. This allows pinpointing which neighboring cells (or source cell) are the main cause(s) of the issue.

To get further insight into the root cause, SHAP analysis on the contribution model (up to the contribution layer) is performed to also determine which KPIs in the offending neighbors are contributing to the issue. An example of this analysis can be seen with reference to FIG. 10, which illustrates a plot matrix 1010 of source cell KPIs from SHAP analysis for one source cell with a network issue and a plot matrix 1020 of neighbor cells KPIs from SHAP analysis for an example according to an embodiment, and with reference to FIG. 11, which illustrates a plot matrix 1110 of normalized source cell KPIs from SHAP analysis for one source cell with a network issue and a plot matrix 1120 of normalized neighbor cells KPIs from SHAP analysis for an example according to an embodiment.

Figure 10:
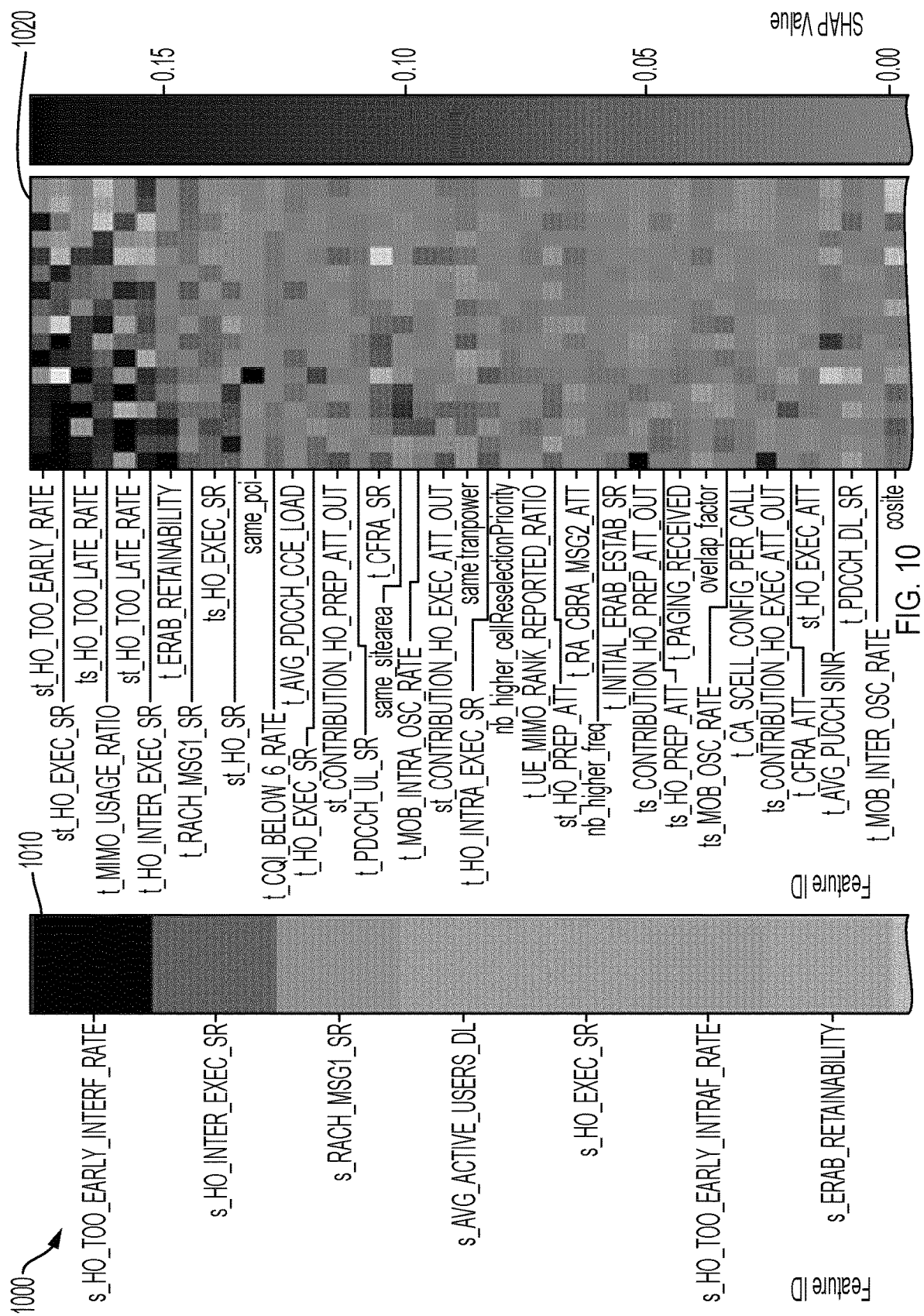
FIG. 10 illustrates a plot matrix of source cell KPIs from SHAP analysis for one source cell with a network issue and a plot matrix of neighbor cells KPIs from SHAP analysis for an example according to an embodiment.
Figure 10:
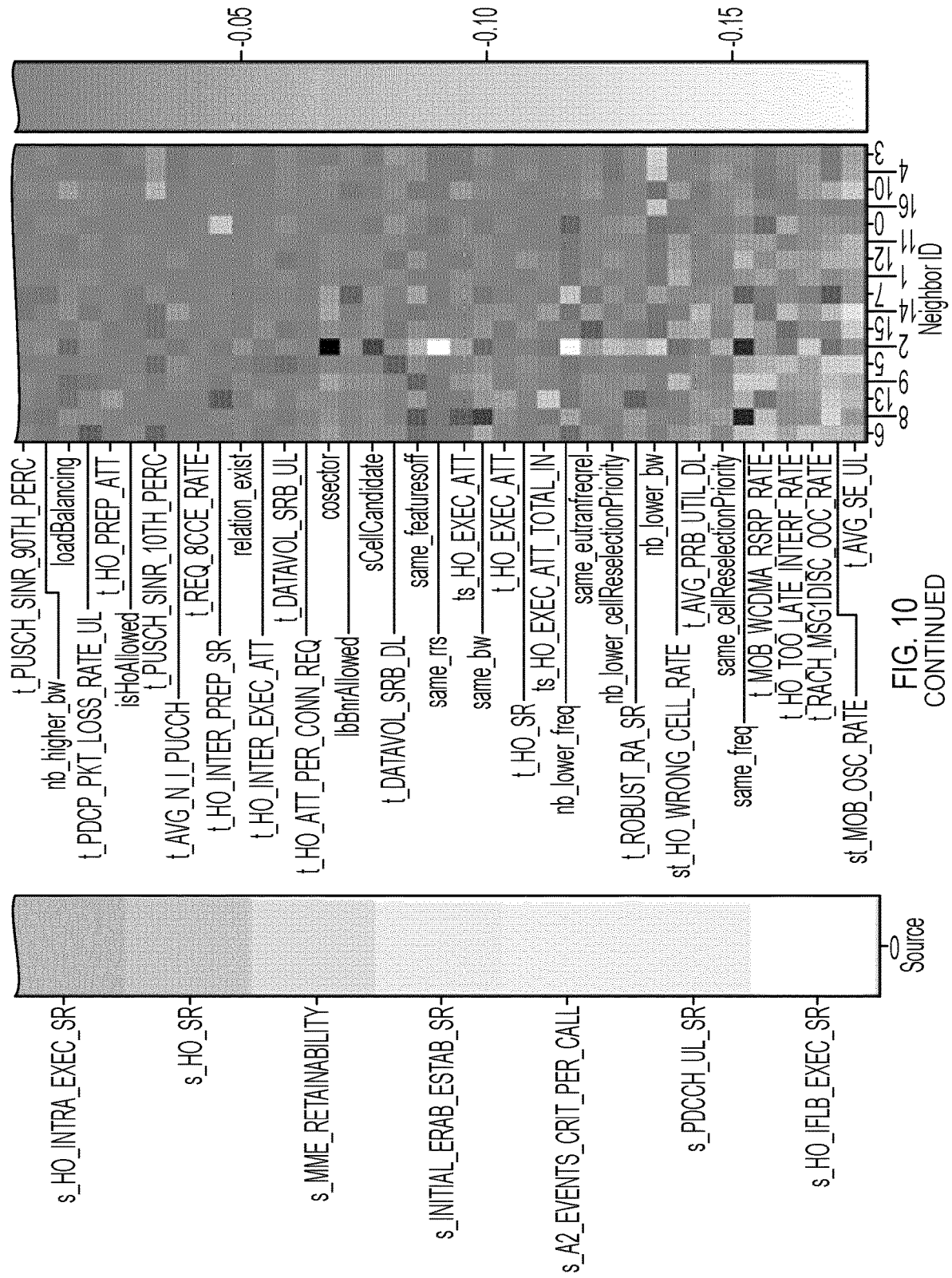
Figure 11:
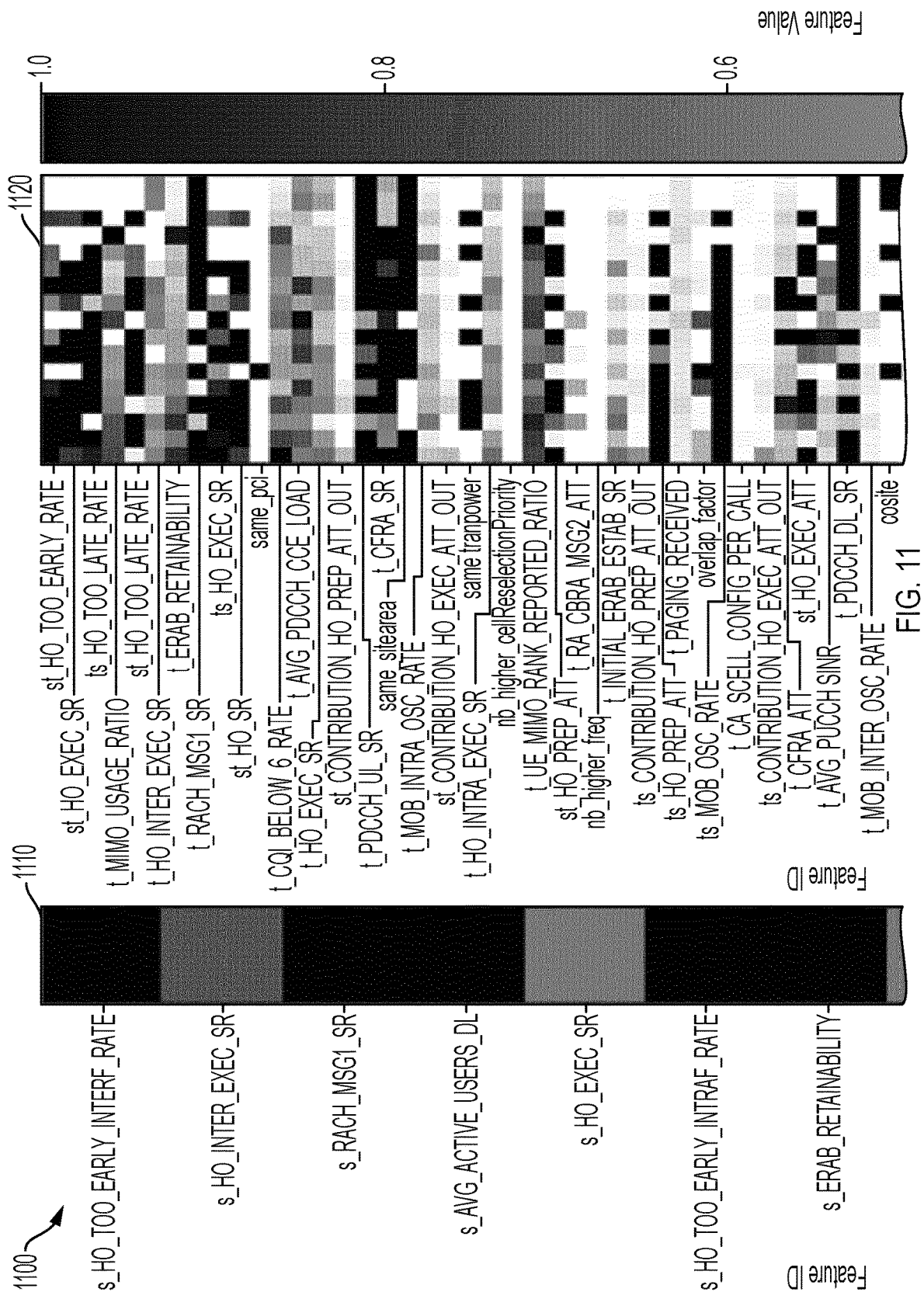
FIG. 11 illustrates a plot matrix of normalized source cell KPIs from SHAP analysis for one source cell with a network issue and a plot matrix of normalized neighbor cells KPIs from SHAP analysis for an example according to an embodiment.
Figure 11:
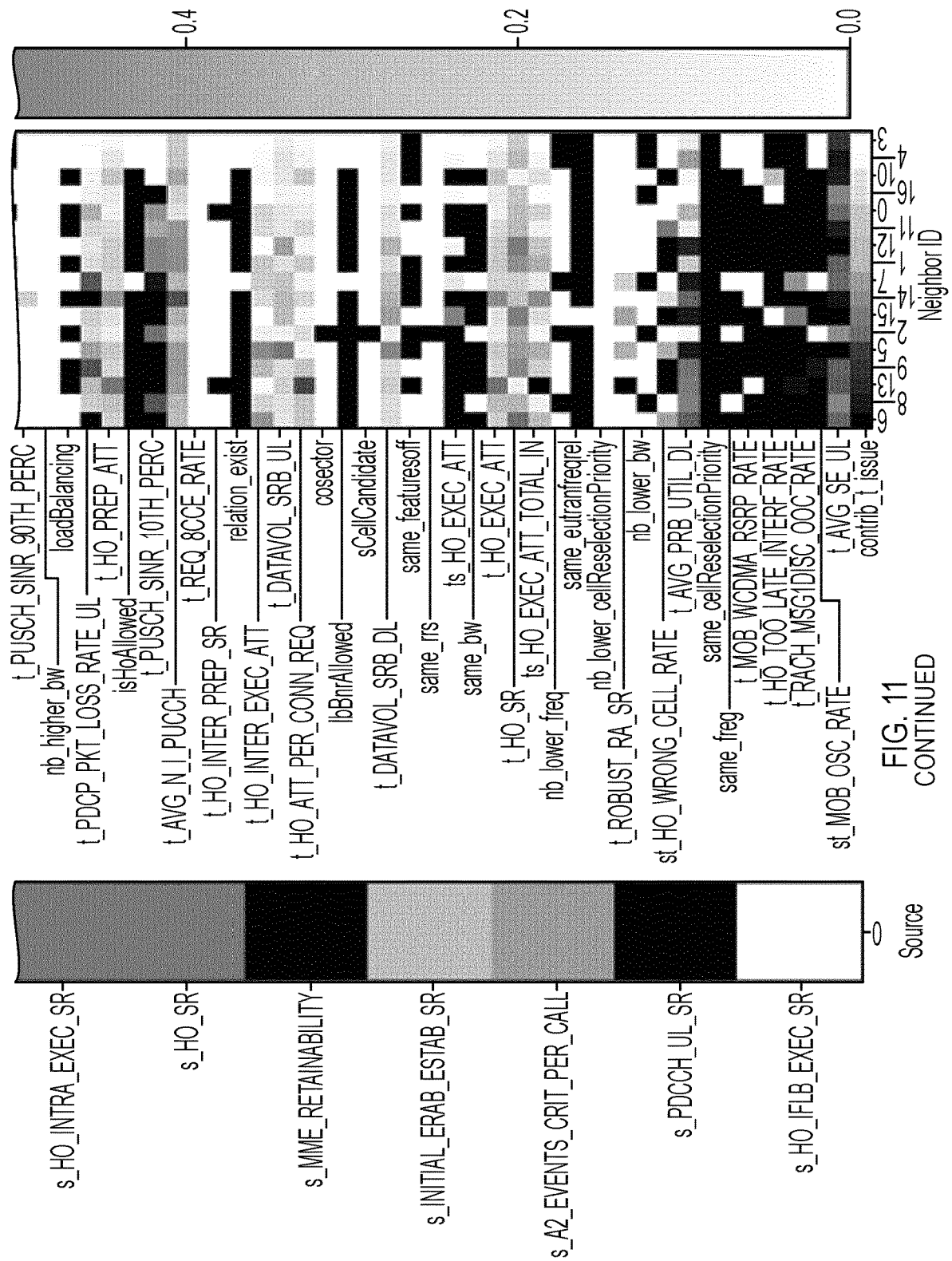

In the figures, the source cell is having an issue, and the contribution model, along with SHAP analysis has identified ~5 neighbor cells that are responsible, in addition to which KPIs in those cells are the main contributors. FIG. 10 shows which KPIs are contributing (in darker shades), and FIG. 11 shows the underlying KPI values. In this case, the source cell is having a handover execution issue and the contribution model has found several cells with high volumes of handovers towards the source cell, poor handover success rate, and some "handover too early" and oscillation issues.

In theory, the contribution model can work with any number of neighbors. In practice, we limit to max 24 neighbors (as was described above in the graph pruning process).

Relation Diagnosis (Clustering Model)

In an exemplary embodiment, a clustering model identifies common patterns in the analysis of the contribution model to simplify the understanding of the root causes. Each neighboring cell is examined individually and how it affects the issue of the source cell in a generic way.

The input to the clustering model is the SHAP output of the contribution model; with reference to FIG. 10, each column of plot matrix 1020 is one input sample vector. If there are 10000 source cells in the dataset, then there are 10000 SHAP matrices of shape #KPIs×24 (assuming 24 neighbors per cell). The dataset size that is input to the clustering is then 10000×24=240000 vectors of size #KPIs. Each of these vectors represents a relationship between a source cell and its neighbor. Clustering on the SHAP values of the contribution model shows multiple advantages: SHAP values tend to be sparse, and therefore serve as a means of dimensionality reduction. Another advantage is that SHAP values are scaled in a similar range across KPIs, and therefore are normalized according to importance to begin with. Finally, SHAP analysis forces the clustering algorithm to focus on specific KPIs that are important relative to the issue being examined. If clustering was based on the KPIs themselves, the clustering algorithm will choose clusters based on our normalization, and on the KPIs that vary the most, and the resulting clusters will reveal little about the issue being examined.

In an exemplary embodiment, the clustering model includes four stages: filtering, dimensionality reduction, clustering algorithm, and classification.

Filtering

The SHAP vectors are first normalized to have unit length and sorted by their contribution values. Each sample corresponds to a column from the output of the contribution model, and therefore has a contribution value assigned to it. The highest and lowest p percentile of the data are taken aside for training (p is a user defined parameter, we use 0.05). Only the extremes of the distribution are used to highlight the most extreme cases when a neighbor relation is either helping or alleviating the issue to not confuse the clustering algorithm with borderline and normal (vast majority) cases. The extreme dataset is E, and the full dataset is F.

Dimensionality Reduction

Principal component analysis (PCA) is used on dataset E to reduce the dimensionality of the inputs to a lower number. This reduction is performed multiple times for different numbers in the range, for example, 3 to 6 (inclusive) and the clustering is run for each, and then the best result is picked. The reduced dataset E is called dataset Er.

Clustering

Hierarchical Density-Based Spatial Clustering of Applications with Noise (HDBSCAN)—see, e.g., McInnes et al., (2017). hdbscan: Hierarchical density based clustering. Journal of Open Source Software, 2(11), 205, doi:10.21105/joss.00205—is used for clustering. HDBSCAN is fast for large amounts of data, it has minimal number of hyperparameters to tune, it detects the number of clusters on its own and allows for non-spherical clusters. Clustering is performed using the Euclidean distance metric on dataset Er. The output of this step is a labeling of each sample in dataset Er to one of potentially several clusters, including an "unlabeled" label which means the sample is not part of any cluster. As indicated, this clustering is run for different values of the PCA reduction dimension. The result with the fewest unlabeled samples is selected. The result is Dataset E and the corresponding labels L.

Classification

A classifier is created at this stage that is light and easy to store and re-use that can be used to classify samples into one of the clusters. The classifier model is a simple two-layer neural network with the number of outputs depending on the number of clusters found by the clustering algorithm. A sigmoid function is used instead of a softmax in the output layer to allow the model to classify a sample as not belonging to any cluster. The classifier model is trained using dataset E and labels L. The trained classifier model is then used to classify the entire dataset F.

Figure 12:
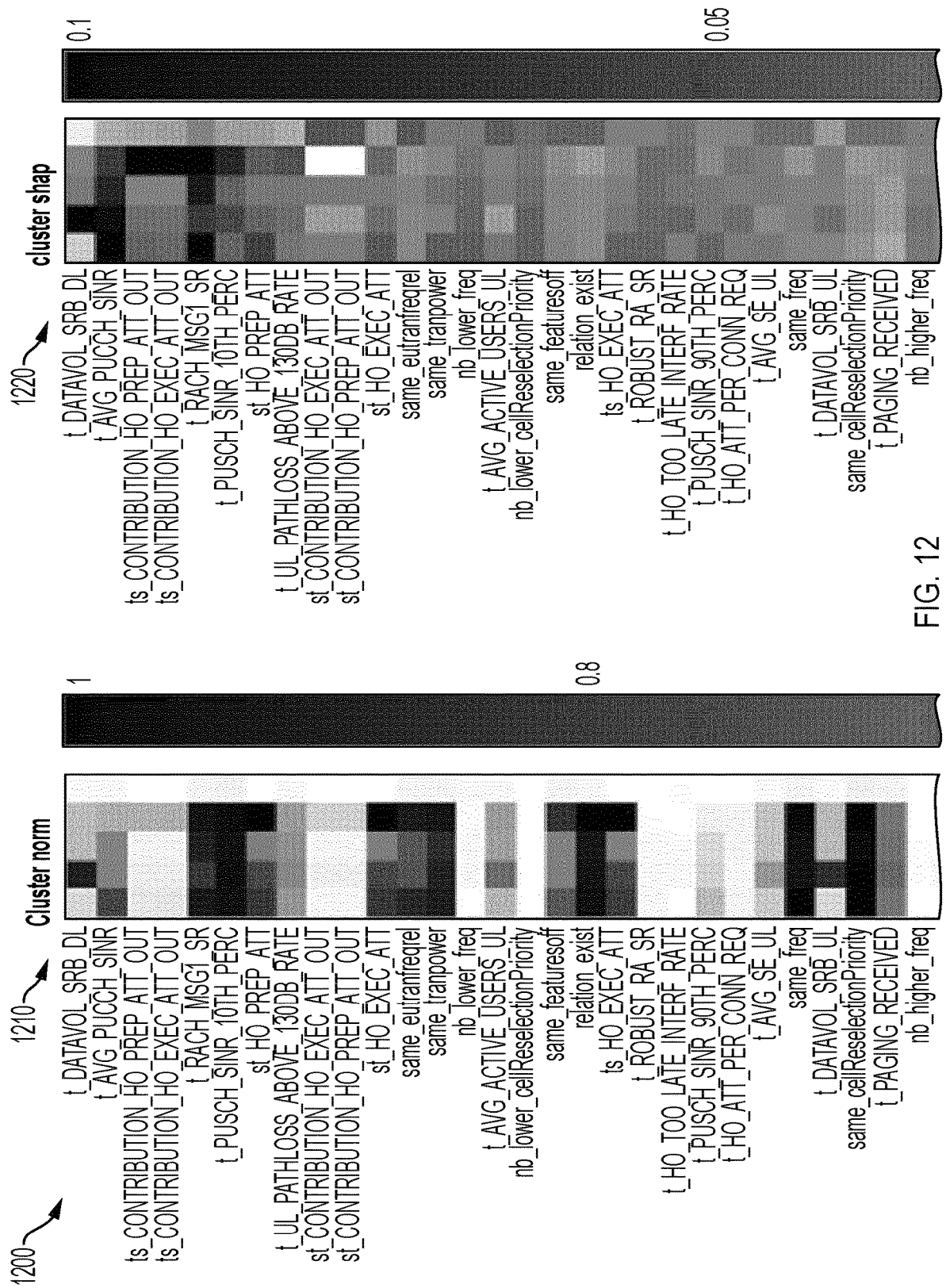
FIG. 12 illustrates a plot matrix of average SHAP values per cluster and a plot matrix of average KPI values per cluster for an example according to an embodiment.
Figure 12:
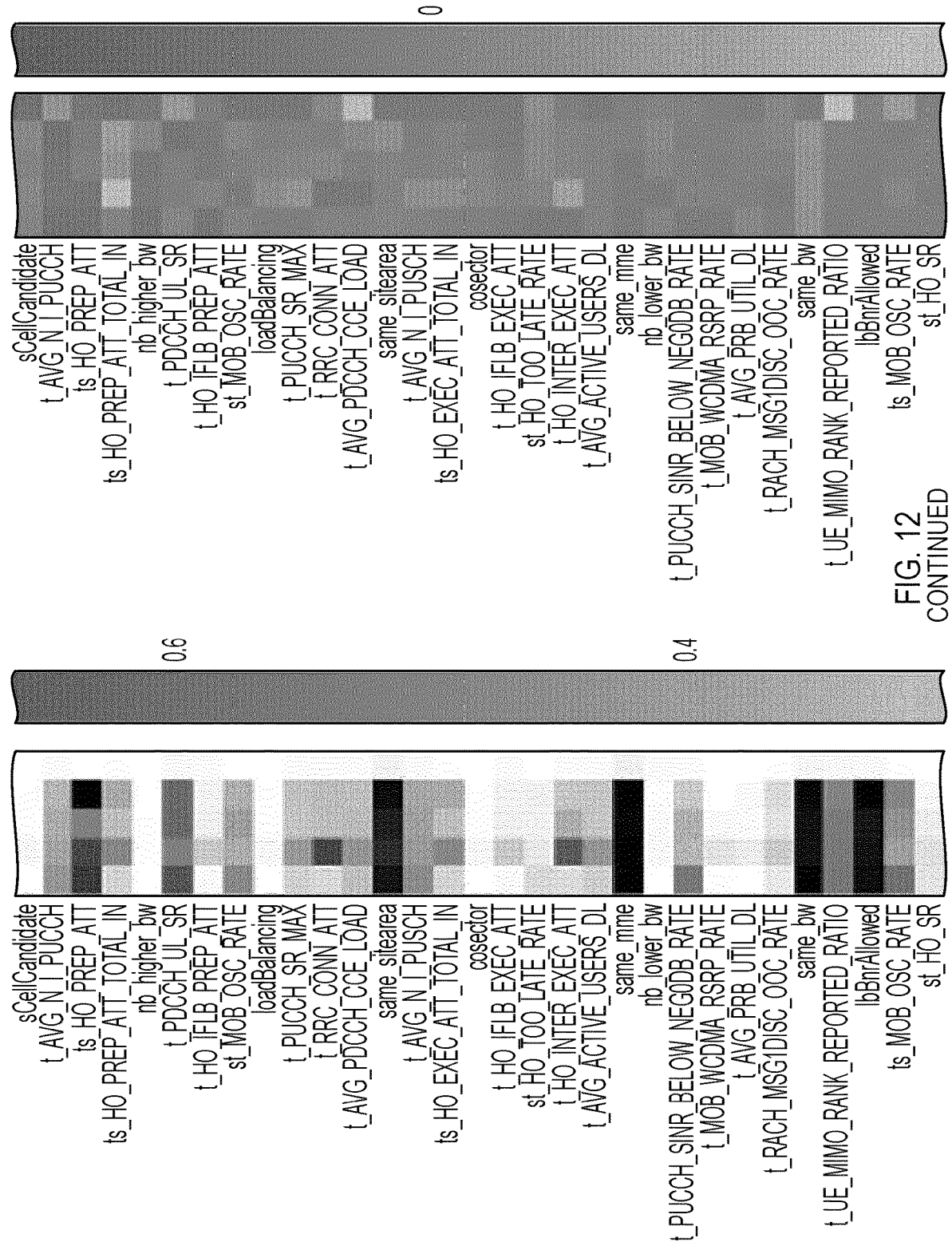
Figure 12:
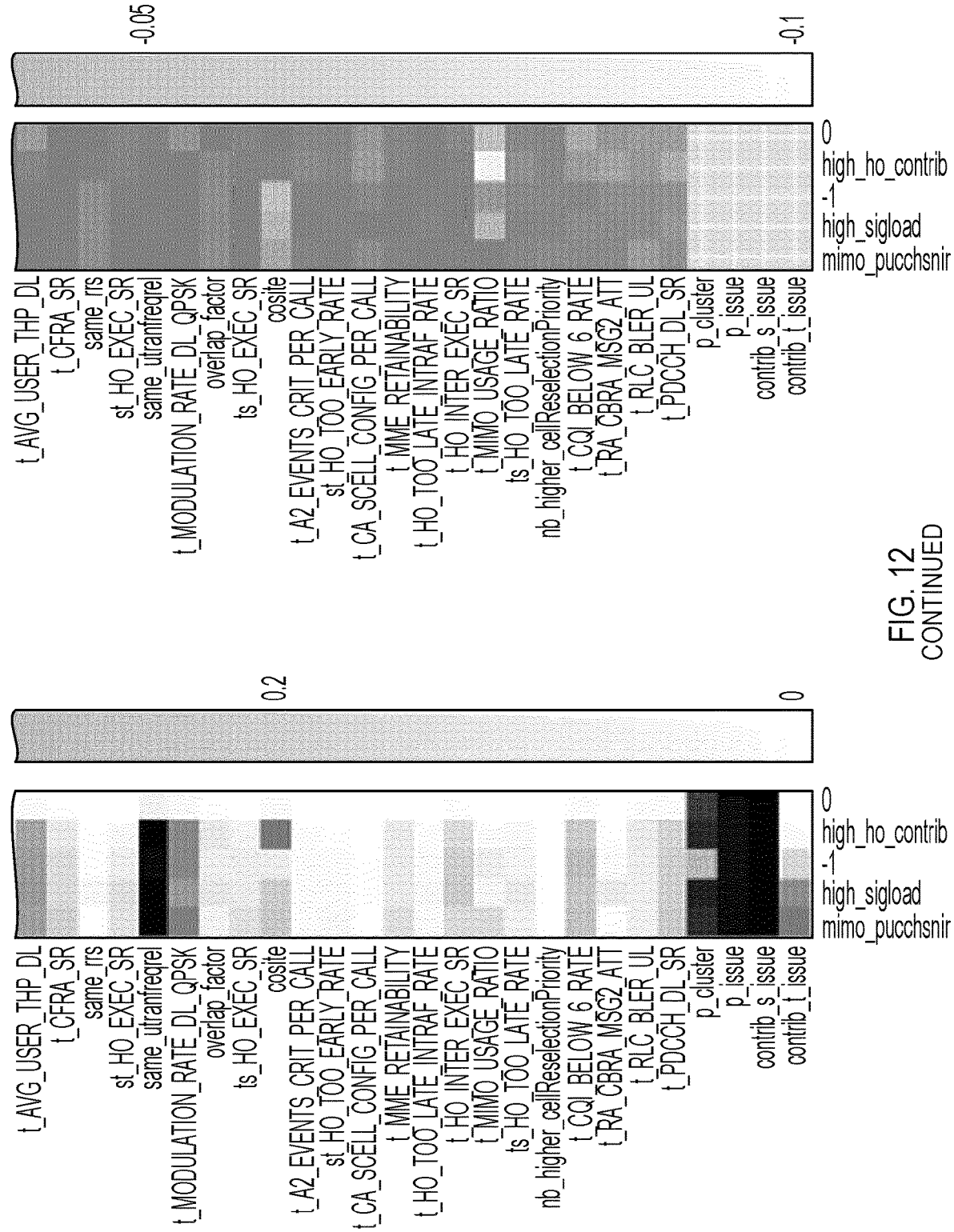

An example of the results of the classification is shown in FIG. 12. FIG. 12 illustrates a plot matrix 1210 of average SHAP values per cluster and a plot matrix 1220 of average KPI values per cluster for an example according to an embodiment. FIG. 12 shows the results of clustering on the issue "Signaling Load". The X axis shows six clusters and the rows are the KPIs. The plot matrix 1210 shows the SHAP values, and the plot matrix 1220 shows the KPI values. The two bottom rows in the plot matrix 1220 show contribution values to signaling load and normal. The plot matrix 1210 and 1220 show that clusters 0, 4 and 5 correspond to cell relations that increase the likelihood of a signaling load issue. The SHAP 1210 and KPI 1220 plots show that cluster 0 refers to cosite cells with high IFLB, and high HO_TOO_LATE. Clusters 4 and 5 correspond to non-cosite neighboring cells with high handover related and signaling related KPIs.

Using this analysis, why a cell has an issue, which neighbors are causing the issue and how, and what other cells in the network are in a similar situation can be identified.

Recommendation

In an exemplary embodiment, the final step involves using the neighbor relation diagnosis to make high-level recommendations that will improve the performance of the affected cells. For example, consider a situation where the contribution model discovers that a source cell's (A) signaling load issue is being primarily caused by neighbor cells B and C. In addition, the relation diagnosis determines that B and C belong to a cluster that is known to have signatures of cells with handover failures due to a high number of too early and wrong cell handovers. Using that information, a recommendation that the network operator revises the inter-frequency handover relation settings and thresholds for target cells B and C can be made.

A domain expert can be consulted to review the cluster profiles produced during the relation diagnosis so that a common recommendation can be formulated for each cluster. This manual review is often a quick process, as the expert need only review the summary of the clustering results (e.g., FIG. 12). Automated recommendations can be made for all samples falling in each of the clusters.

In some embodiments, the data obtained for each cell of the plurality of cells relates to performance metrics, cell configuration information, cell relation information and an operating condition, and wherein the features of the cells represented in the network graph relates to performance metrics, cell configuration information, cell relation information and an operating condition.

In some embodiments, the root cause information for the issue identified includes identifying one or more of: the neighbor cells involved in causing the network issue, performance metrics for the neighbor cells involved in causing the network issue, cell relation information for neighbor cells involved in causing the network issue, and operating condition data for neighbor cells involved in causing the network issue.

In some embodiments, at least some of the obtained data for each cell of the plurality of cells relating to performance metrics, cell configuration information, cell relation information, and an operating condition is time-sampled data. In some embodiments, the performance metrics for the source cell and the neighbor cells of the source cell includes one or more of: cell key performance indicators (KPIs) having performance data for each source cell and the neighbor cells of the source cell, and relationship KPIs having performance data of the interactions from the source cell to the neighbor cells of the source cell and from the neighbor cells to the source cell.

In some embodiments, the cell configuration information and cell relation information for the source cell and the neighbor cells of the source cell includes one or more of: physical proximity, relation level performance metrics, relation level configuration information, and overlap. In some embodiments, the operating condition for the source cell and the neighbor cells of the source cell includes one or more of: normal conditions and network issues.

In some embodiments, building the network graph includes generating a first matrix and a second matrix with one or more of the performance metrics, cell configuration, cell relation, and operating condition features of the cells, wherein the first matrix includes vectors of cell key performance indicators (KPIs) having performance data for each source cell and the neighbor cells of the source cell, and the second matrix includes vectors of relationship KPIs having performance data of the interactions from the source cell to the neighbor cells of the source cell and from the neighbor cells to the source cell.

In some embodiments, the maximum number of neighbor cells in the set of neighbor cells selected based on rank is not determined. In some embodiments, the maximum number of cells, excluding the source cell, for each sub-graph is not determined.

In some embodiments, ranking each feature for each neighbor cell represented in the sub-graph for the source cell includes generating a neighbor feature matrix ranking each feature for each neighbor cell represented in the sub-graph for the source cell, and the set of ranked neighbor features is identified based on the neighbor feature matrix generated.

In some embodiments, generating the neighbor feature matrix and identifying a set of ranked neighbor features includes training a third ML model, generating Shapley Additive Explanations (SHAP) calculations, using the SHAP calculations to obtain a list of neighbor cell feature importance for each feature, and culling features from the list based on the calculated importance, and wherein the third ML model is one of: a neural network (NN), graph neural network (GNN), and a graph attention network (GAT).

In some embodiments, ranking each feature of the source cell for each sub-graph includes generating a source feature matrix, and the set of ranked source features is identified based on the source feature matrix generated.

In some embodiments, generating the source feature matrix and identifying a set of ranked source features includes training a random forest model, generating Shapley Additive Explanations (SHAP) calculations, using the SHAP calculations to obtain a list of source cell feature importance for each feature, and culling features from the list based on the calculated importance.

In some embodiments, the first ML model is one of: a neural network, a graph neural network (GNN), a graph convolutional network (GCN), and a relational graph convolutional network (R-GCN).

In some embodiments, training the first ML model and determining a neighbor contribution value includes applying to each neighbor cell independently two stacked dense layers of the first ML model. In some embodiments, training the first ML model and determining a source contribution value includes applying to each source cell independently two stacked dense layers of the first ML model.

In some embodiments, identifying the set of contributing features includes filtering the neighbor contribution values and source contribution values in the form of SHAP vectors and reducing the dimensionality of the SHAP vectors using principal components analysis. In some embodiments, the clustering model is built using hierarchical density-based spatial clustering of applications with noise (HDBSCAN).

In some embodiments, the second ML model is one of: a neural network (NN) and a multi-layer neural network, and wherein the output layer uses a sigmoid function. In some embodiments, a label is assigned to each cluster to identify the pattern, and training the second ML model using the patterns identified by each cluster includes using the assigned labels.

In some embodiments, the method further includes obtaining, using the set of contributing source features to the network issue, insights for the root cause information for the network issue. In some embodiments, the method further includes obtaining, using the set of contributing neighbor features to the network issue, insights for the root cause information for the network issue.

Figure 13:
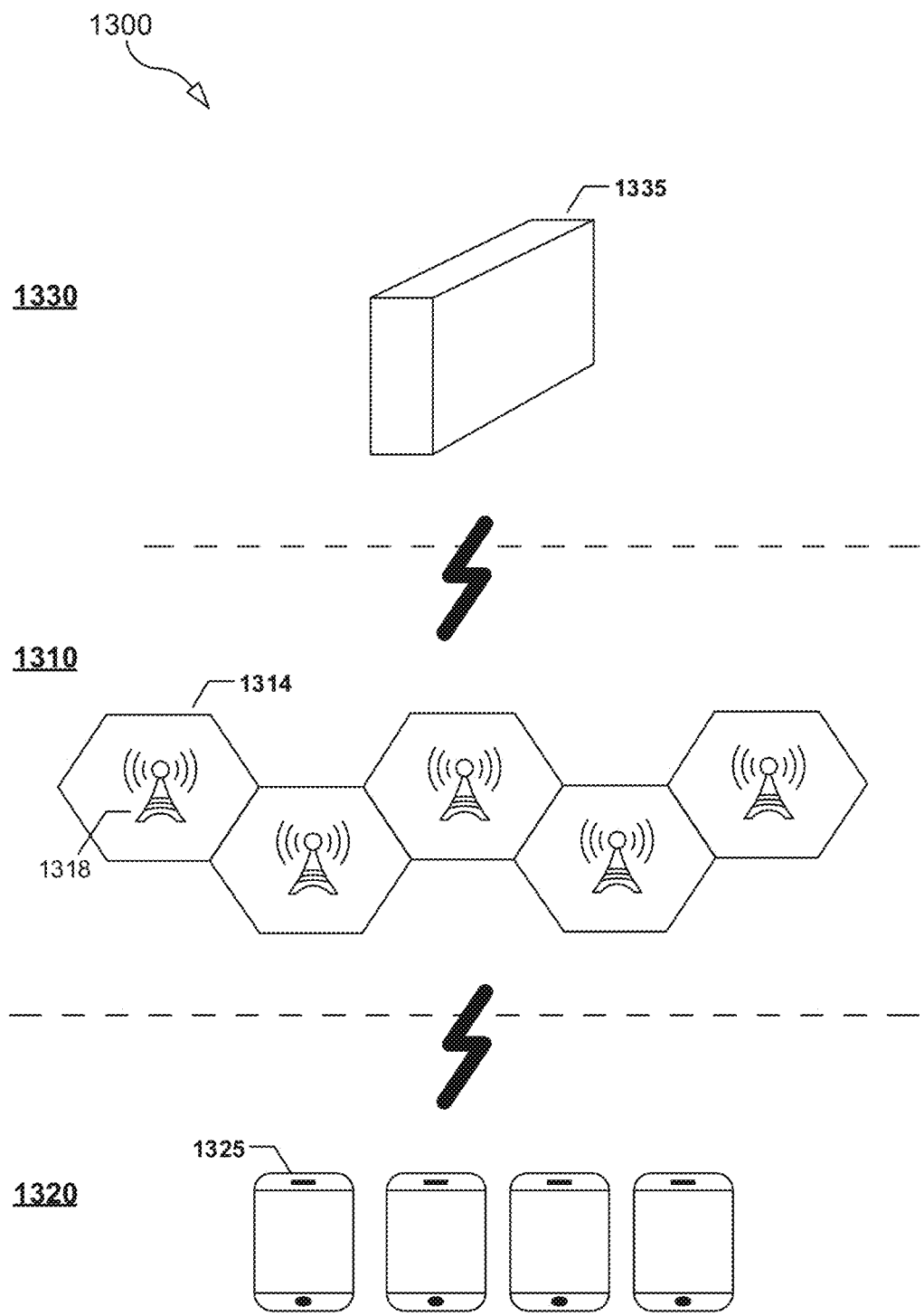
FIG. 13 is a wireless communication system according to exemplary embodiments.

FIG. 13 shows a wireless communication system according to some embodiments. In the exemplary embodiment illustrated, the system comprises a radio access network 1310, terminal devices such as wireless terminals or User Equipments (UEs) 1320, and a core network 1330. The core network 1330 may comprise a plurality of core network servers 1335, and/or may be in communication with one or more servers 1335.

The radio access network 1310 is a wireless cellular network comprising a plurality of radio access network nodes 1318, each serving one or more cells 1314 (e.g., source cells and neighbor cells). In the illustrated example, each radio access network node 1318 serves a single cell 1314; however, it will be appreciated that in different examples, a radio access network node 1318 may be configured to serve more than one cell, and/or a single cell may be served by more than one radio access node. Such an arrangement may be found in a heterogeneous network deployment, comprising one or more macro nodes supported by one or more micro, femto or pico nodes. As used herein, a radio access network node corresponds to any type of network node which communicates with a terminal device. Examples of radio access network nodes include NodeB, eNodeB, Master eNodeB, Secondary eNodeB, a network node belonging to a Master Cell Group (MSG) or Secondary Cell Group (SCG), base station (BS), Multi-Standard Radio (MSR) radio node such as MSR BS, eNodeB, gNodeB, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), etc.

Where the disclosure refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes. The core network 1300 comprises or is coupled to a server 1335, which is therefore communicatively coupled to the radio access network 1310. According to exemplary embodiments, the server 1335 is configured to receive data from the radio access network 1310, and to perform one or more methods for automated root cause analysis of network issues in a cellular network as described herein.

Figure 14:
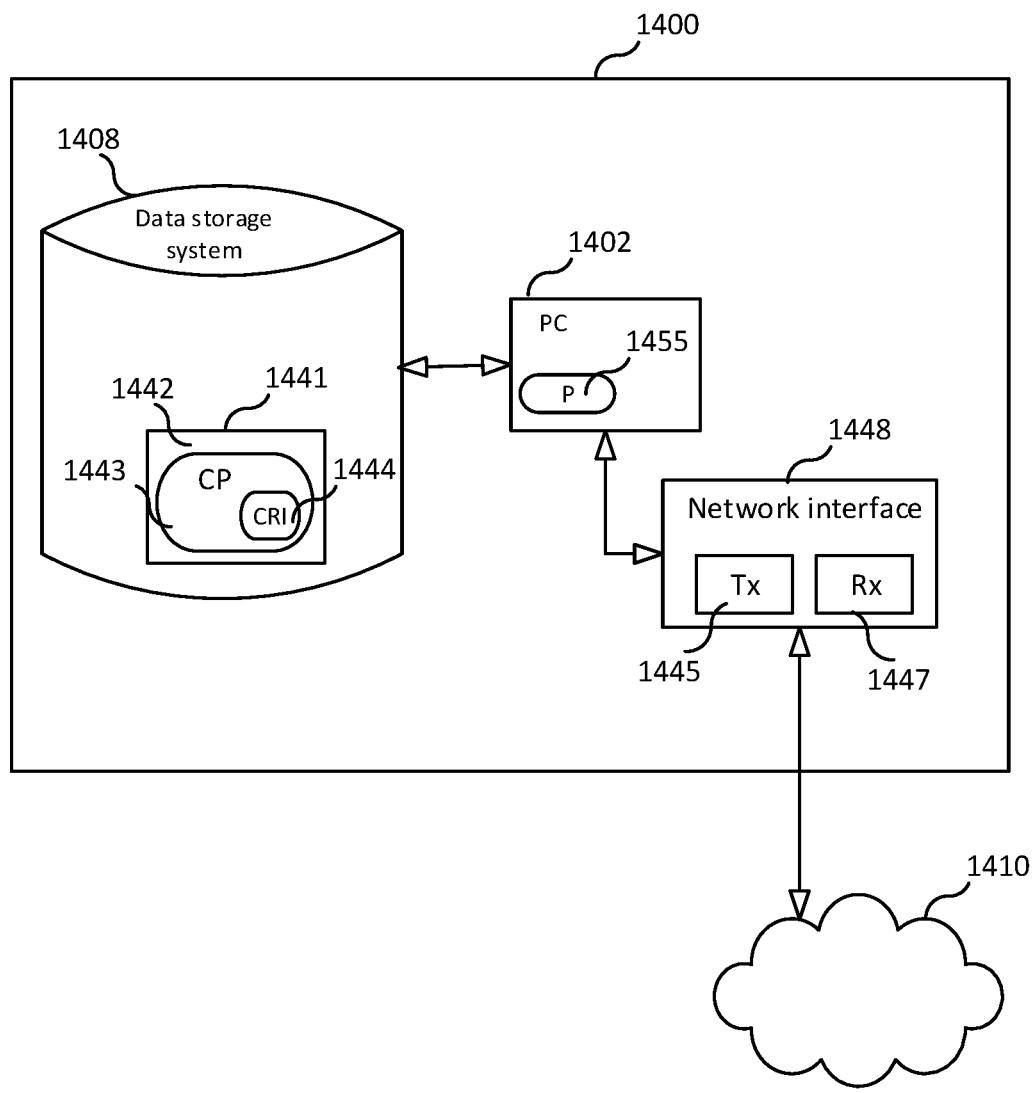
FIG. 14 is a block diagram of an apparatus according to exemplary embodiments.

FIG. 14 is a block diagram of an apparatus 1400, according to some embodiments. As shown in FIG. 14, the apparatus may comprise: processing circuitry (PC) 1402, which may include one or more processors (P) 1455 (e.g., a general purpose microprocessor and/or one or more other processors, such as an application specific integrated circuit (ASIC), field-programmable gate arrays (FPGAs), and the like); a network interface 1448 comprising a transmitter (Tx) 1445 and a receiver (Rx) 1447 for enabling the apparatus to transmit data to and receive data from other computing devices connected to a network 1410 (e.g., an Internet Protocol (IP) network) to which network interface 1448 is connected; and a local storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 1441 includes a computer readable medium (CRM) 1442 storing a computer program (CP) 1443 comprising computer readable instructions (CRI) 1444. CRM 1442 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI 1444 causes the apparatus to perform steps described herein (e.g., steps described herein with reference to the flow charts). In other embodiments, the apparatus may be configured to perform steps described herein without the need for code. That is, for example, PC 602 may consist merely of one or more ASICs. Hence, the features of the embodiments described herein may be implemented in hardware and/or software.

Figure 15:
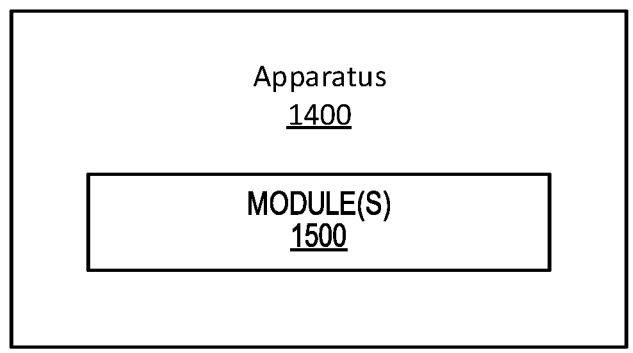
FIG. 15 is a block diagram of an apparatus according to exemplary embodiments.

FIG. 15 is a schematic block diagram of the apparatus 1400 according to some other embodiments. The apparatus 1400 includes one or more modules 1500, each of which is implemented in software. The module(s) 1500 provide the functionality of apparatus 1400 described herein (e.g., steps described herein with reference to the flow charts).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer-implemented method for analyzing issues in a cellular network, wherein the cellular network includes a plurality of cells and wherein the plurality of cells include a plurality of source cells and a plurality of neighbor cells, the method comprising:
   obtaining data for each cell of the plurality of cells;
   building a network graph, using the data obtained, representing features of the plurality of cells, wherein, for each source cell of the plurality of source cells, each neighbor cell of said each source cell is ranked based on the data obtained for said each neighbor cell;
   identifying, using the network graph, a plurality of sub-graphs for said each source cell indicating a network issue, wherein each sub-graph of the plurality of sub-graphs represents features of said each source cell and a set of neighbor cells selected based on rank and features of the plurality of neighbor cells;
   for each network issue of said each source cell for said each sub-graph of the plurality of sub-graphs, ranking each feature of said each neighbor cell represented in said each sub-graph for said each source cell and identifying a set of ranked neighbor features;
   for each network issue of said each source cell for said each sub-graph of the plurality of sub-graphs, ranking each feature of said each source cell for said each sub-graph and identifying a set of ranked source features;
   identifying, using the set of ranked neighbor features and the set of ranked source features, a feature set for all sub-graphs, wherein the feature set includes all or a reduced set of features;
   for said each source cell, training, using the feature set identified, a first machine learning (ML) model for said each neighbor cell in the set of neighbor cells for said each source cell and determining a neighbor contribution value for said each neighbor cell, representing the contribution of said each neighbor cell to said each network issue;
   for said each source cell, training, using the feature set identified, the first ML model for said each source cell and determining a source contribution value for said each source cell representing the contribution of said each source cell to said each network issue;
   for said each network issue for said each source cell, using the neighbor contribution values and source contribution values to identify a set of contributing features from the feature set identified that contribute to said each network issue;
   building, using the set of contributing features, a clustering model having a plurality of clusters, wherein each cluster of the plurality of clusters identifies a pattern of one or more neighbor cells contribution to said each network issue;
   training a second ML model, using the patterns identified by each cluster of the plurality of clusters, to classify an unidentified pattern of one or more neighbor cells contribution to said each network issue and identify root cause information for said each network issue.

2. The method according to claim 1, wherein the data obtained for each cell of the plurality of cells relates to performance metrics, cell configuration information, cell relation information and an operating condition, and wherein the features of the plurality of cells represented in the network graph relates to performance metrics, cell configuration information, cell relation information and an operating condition.

3. The method according to claim 2, wherein the root cause information for the issue identified includes identifying one or more of: the plurality of neighbor cells involved in causing the network issue, performance metrics for the plurality of neighbor cells involved in causing the network issue, cell relation information for the plurality of neighbor cells involved in causing the network issue, and operating condition data for the plurality of neighbor cells involved in causing the network issue.

4. The method according to claim 2, wherein at least some of the obtained data for each cell of the plurality of cells relating to performance metrics, cell configuration information, cell relation information, and an operating condition is time-sampled data.

5. The method according to claim 2, wherein the performance metrics for said each source cell and the plurality of neighbor cells of said each source cell includes one or more of: cell key performance indicators (KPIs) having performance data for said each source cell and the plurality of neighbor cells of said each source cell, and relationship KPIs having performance data of the interactions from said each source cell to the plurality of neighbor cells of said each source cell and from the plurality of neighbor cells to said each source cell.

6. The method according to claim 2, wherein the cell configuration information and cell relation information for said each source cell and the plurality of neighbor cells of said each source cell includes one or more of: physical proximity, relation level performance metrics, relation level configuration information, and overlap.

7. The method according to claim 2, wherein the operating condition for said each source cell and the plurality of neighbor cells of said each source cell includes one or more of: normal conditions and network issues.

8. The method according to claim 2, wherein building the network graph includes generating a first matrix and a second matrix with one or more of the performance metrics, cell configuration, cell relation, and operating condition features of the cells, wherein the first matrix includes vectors of cell key performance indicators (KPIs) having performance data for said each source cell and the plurality of neighbor cells of said each source cell, and the second matrix includes vectors of relationship KPIs having performance data of the interactions from said each source cell to the plurality of neighbor cells of said each source cell and from the plurality of neighbor cells to said each source cell.

9. The method according to claim 1, wherein a maximum number of neighbor cells in the set of neighbor cells selected based on rank is not determined.

10. The method according to claim 1, wherein a maximum number of plurality of cells, excluding the source cell, for each sub-graph is—not determined.

11. The method according to claim 1, wherein ranking each feature for each neighbor cell represented in the sub-graph for said each source cell includes generating a neighbor feature matrix ranking each feature for each neighbor cell represented in the sub-graph for said each source cell, and the set of ranked neighbor features is identified based on the neighbor feature matrix generated.

12. The method according to claim 11, wherein generating the neighbor feature matrix and identifying a set of ranked neighbor features includes training a third ML model, generating Shapley Additive Explanations (SHAP) calculations, using the SHAP calculations to obtain a list of neighbor cell feature importance for each feature, and culling features from the list based on the calculated importance, and wherein the third ML model is one of: a neural network (NN), graph neural network (GNN), and a graph attention network (GAT).

13. The method according to claim 1, wherein ranking each feature of said each source cell for said each sub-graph includes generating a source feature matrix, and the set of ranked source features is identified based on the source feature matrix generated.

14. The method according to claim 12, wherein generating the source feature matrix and identifying a set of ranked source features includes training a random forest model, generating Shapley Additive Explanations (SHAP) calculations, using the SHAP calculations to obtain a list of source cell feature importance for each feature, and culling features from the list based on the calculated importance.

15. The method according to claim 12, wherein the first ML model is one of: a neural network, a graph neural network (GNN), a graph convolutional network (GCN), and a relational graph convolutional network (R-GCN).

16. The method according to claim 15, wherein training the first ML model and determining a neighbor contribution value includes applying to each neighbor cell independently two stacked dense layers of the first ML model.

17. The method according to claim 16, wherein training the first ML model and determining a source contribution value includes applying to said each source cell independently two stacked dense layers of the first ML model.

18. The method according to claim 14, wherein identifying the set of contributing features includes filtering the neighbor contribution values and source contribution values in the form of SHAP vectors and reducing the dimensionality of the SHAP vectors using principal components analysis.

19. An apparatus comprising:
processing circuitry; and
a memory containing instructions executable by the processing circuitry for analyzing issues in a cellular network, wherein the cellular network includes a plurality of cells and wherein the plurality of cells include a plurality of source cells and a plurality of neighbor cells, the apparatus operative to:
obtain data for each cell of the plurality of cells;
build a network graph, using the data obtained, representing features of the plurality of cells, wherein, for each source cell of the plurality of source cells, each neighbor cell of said each source cell is ranked based on the data obtained for said each neighbor cell;
identify, using the network graph, a plurality of sub-graphs for said each source cell indicating a network issue, wherein each sub-graph of the plurality of sub-graphs represents features of said each source cell and a set of neighbor cells selected based on rank and features of the plurality of neighbor cells;
for each network issue of said each source cell for said each sub-graph of the plurality of sub-graphs, rank each feature of said each neighbor cell represented in said each sub-graph for said each source cell and identify a set of ranked neighbor features;
for each network issue of said each source cell for said each sub-graph of the plurality of sub-graphs, rank each feature of said each source cell for said each sub-graph and identify a set of ranked source features;
identify, using the set of ranked neighbor features and the set of ranked source features, a feature set for all sub-graphs, wherein the feature set includes all or a reduced set of features;
for said each source cell, train, using the feature set identified, a first machine learning (ML) model for said each neighbor cell in the set of neighbor cells for said each source cell and determine a neighbor contribution value for said each neighbor cell, representing the contribution of said each neighbor cell to said each network issue;
for said each source cell, train, using the feature set identified, the first ML model for said each source cell and determine a source contribution value for said each source cell representing the contribution of said each source cell to said each network issue;
for said each network issue for said each source cell, use the neighbor contribution values and source contribution values to identify a set of contributing features from the feature set identified that contribute to said each network issue;
build, using the set of contributing features, a clustering model having a plurality of clusters, wherein each cluster of the plurality of clusters identifies a pattern of one or more neighbor cells contribution to said each network issue;
train a second ML model, using the patterns identified by each cluster of the plurality of clusters, to classify an unidentified pattern of one or more neighbor cells contribution to said each network issue and identify root cause information for said each network issue.

20. A computer program product comprising a non-transitory computer readable medium storing a computer program comprising instructions which, when executed by processing circuitry, causes the processing circuitry to:
obtain data for each cell of the plurality of cells;
build a network graph, using the data obtained, representing features of the plurality of cells, wherein, for each source cell of the plurality of source cells, each neighbor cell of said each source cell is ranked based on the data obtained for said each neighbor cell;
identify, using the network graph, a plurality of sub-graphs for said each source cell indicating a network issue, wherein each sub-graph of the plurality of subgraphs represents features of said each source cell and a set of neighbor cells selected based on rank and features of the plurality of neighbor cells;

for each network issue of said each source cell for said each sub-graph of the plurality of sub-graphs, rank each feature for said each neighbor cell represented in said each sub-graph for said each source cell and identify a set of ranked neighbor features;

for each network issue of said each source cell for said each sub-graph of the plurality of sub-graphs, rank each feature of said each source cell for said each sub-graph and identify a set of ranked source features;

identify, using the set of ranked neighbor features and the set of ranked source features, a feature set for all sub-graphs, wherein the feature set includes all or a reduced set of features;

for said each source cell, train, using the feature set identified, a first machine learning (ML) model for said each neighbor cell in the set of neighbor cells for said each source cell and determine a neighbor contribution value, for said each neighbor cell, representing the contribution of said each neighbor cell to said each network issue;

for said each source cell, train, using the feature set identified, the first ML model for said each source cell and determine a source contribution value for said each source cell representing the contribution of said each source cell to said each network issue;

for said each network issue for said each source cell, use the neighbor contribution values and source contribution values to identify a set of contributing features from the feature set identified that contribute to said each network issue;

build, using the set of contributing features, a clustering model having a plurality of clusters, wherein each cluster of the plurality of clusters identifies a pattern of one or more neighbor cells contribution to said each source cell network issue;

train a second ML model, using the patterns identified by each cluster of the plurality of clusters, to classify an unidentified pattern of one or more neighbor cells contribution to said each cell network issue and identify root cause information for said each network issue.

* * * * *